United States Patent
Moore et al.

(10) Patent No.: US 8,522,082 B1
(45) Date of Patent: Aug. 27, 2013

(54) METHOD AND APPARATUS FOR IDENTIFYING REMEDIATION FAILURES IN YEAR-2000 REMEDIATION PROGRAMS

(75) Inventors: Brian B. Moore, Poughkeepsie, NY (US); Gregory A. Burke, Poughkeepsie, NY (US); David E. Lee, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/561,273

(22) Filed: Apr. 28, 2000

(51) Int. Cl.
*G06F 11/00* (2006.01)

(52) U.S. Cl.
USPC .......................................... 714/38.1; 717/126

(58) Field of Classification Search
USPC ................... 714/38, 38.1; 717/124, 126–128
See application file for complete search history.

(56) References Cited

U.S. PATENT DOCUMENTS

| | | | |
|---|---|---|---|
| 5,600,836 A | 2/1997 | Alter | 395/612 |
| 5,644,762 A | 7/1997 | Soeder | 395/606 |
| 5,668,989 A | 9/1997 | Mao | 395/612 |
| 5,737,735 A | 4/1998 | Soeder | 707/6 |
| 5,740,442 A | 4/1998 | Cox et al. | 395/704 |
| 5,758,336 A | 5/1998 | Brady | 707/6 |
| 5,761,668 A | 6/1998 | Adamchick | 707/101 |
| 5,797,117 A | 8/1998 | Gregovich | 707/101 |
| 5,806,063 A | 9/1998 | Dickens | 707/6 |
| 5,808,889 A | 9/1998 | Burgess | 364/737 |
| 5,809,500 A | 9/1998 | Nolan | 707/6 |
| 5,812,841 A | 9/1998 | Soeder | 395/606 |
| 5,828,890 A | 10/1998 | Rehbock et al. | 395/733 |
| 5,835,909 A | 11/1998 | Alter | 707/101 |
| 5,845,286 A | 12/1998 | Colizza | 707/101 |
| 5,930,782 A * | 7/1999 | Shaughnessy | 707/1 |
| 6,003,028 A * | 12/1999 | Koenig | 707/6 |
| 6,041,330 A * | 3/2000 | Carman et al. | 707/101 |
| 6,067,544 A | 5/2000 | Moore | 707/6 |
| 6,071,317 A * | 6/2000 | Nagel | 717/128 |
| 6,253,336 B1 * | 6/2001 | Moore | 714/38 |
| 6,279,127 B1 * | 8/2001 | Moore | 714/47 |
| 6,317,746 B1 * | 11/2001 | Franklin et al. | 707/101 |

FOREIGN PATENT DOCUMENTS

| | | |
|---|---|---|
| WO | WO 97/38379 | 10/1997 |
| WO | WO 98/12632 | 3/1998 |
| WO | WO 98/29809 | 7/1998 |

OTHER PUBLICATIONS

Tsai et al., "An Approach to Modify and Test Expired Window Logic," 2000, IEEE, pp. 99-108.*
"A Definition of Year 2000 Conformity Requirements," 1998, British Standards Institution.*
Onoma et al., "Regression Testing in an Industrial Environment," May 1998, Communications of the ACM, vol. 41, No. 5, pp. 8 86.*

(Continued)

*Primary Examiner* — Michael Maskulinski
(74) *Attorney, Agent, or Firm* — William A. Kinnaman, Jr.

(57) ABSTRACT

Object-code instruction traces are employed to analyze selected instructions of a year-2000 (Y2K) remediated application program for possible remediation failure when confronted by a year-2000 date. The analysis includes directly identifying one or more instructions of the remediated application program that may fail. A remediation-failure-pattern descriptor is assigned to each examined instruction which is indicative of whether the remediated instruction may fail when confronted by a date in the year-2000 range. The analysis employs user-specifiable run-control values, as well as predetermined filter-specification values in comparing traces of each selected object-code instruction to predefined remediation-failure patterns.

27 Claims, 8 Drawing Sheets

(56) References Cited

OTHER PUBLICATIONS

Interesse et al., "Beyond Year 2000 Remediation: the Compliance Verification A Case Study".*

Year 2000 Computing Crisis: A Testing Guide, United States General Accounting Office, Accounting and Information Management Division, Nov. 1998.*

U.S. Appl. No. 09/133,878, filed Aug. 14, 1998 entitled Year-2000 Windowing and Cycling Functions for S/390 Object Code, by Brian B. Moore.

U.S. Appl. No. 09/136,279, filed Aug. 20, 1998 entitled System for Predicting Year-2000 Instruction Failures, by Brian B. Moore.

U.S. Appl. No. 09/137,465, filed Aug. 20, 1998 entitled Predicting Year-2000 Instruction Failures by Brian B . Moore.

U.S. Appl. No. 09/122,268, filed Jul. 24, 1998 entitled Runtime Year-2000 System Solution Process, Method and Article of Manufacture, by Brian B. Moore et al.

U.S. Appl. No. 09/122,560, filed Jul. 24, 1998 entitled Identifying Date Fields for Runtime Year 2000 System Solution Process, Method and Article of Manufacture, by L.C. Balfour et al.

* cited by examiner

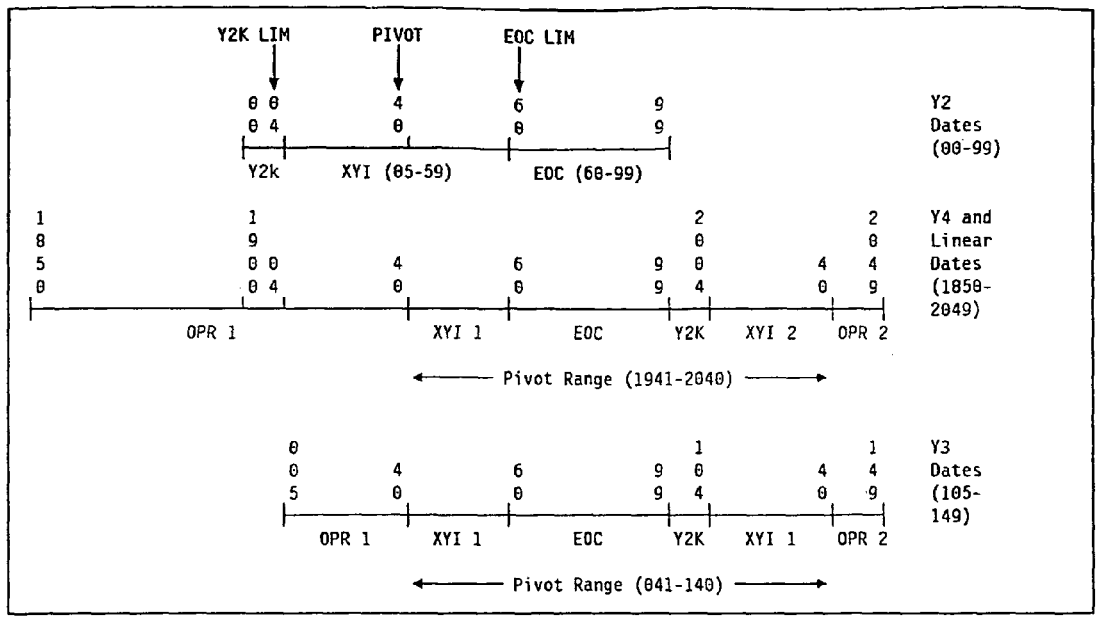
Figure 7 Y2K, XYI, and EOC ranges – Example 1. Y2K LIM = 04, EOC LIM = 60, and PIVOT = 1940.
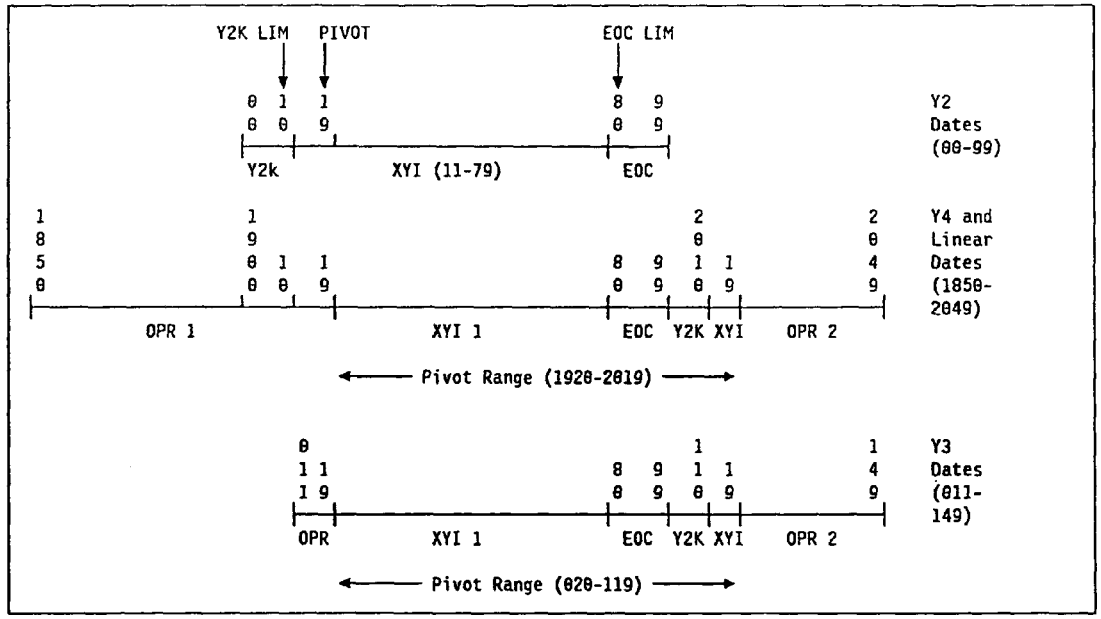
Figure 8 Y2K, XYI, and EOC ranges – Example 2. Y2K LIM = 10, EOC LIM = 80, and PIVOT = 1919.

METHOD AND APPARATUS FOR IDENTIFYING REMEDIATION FAILURES IN YEAR-2000 REMEDIATION PROGRAMS

BACKGROUND OF THE INVENTION

1. Field of the Invention

The present invention relates generally to computer system diagnostics and, in particular, to a computer-implemented capability for detecting the presence of individual failures in compiled computer programs that have been updated (i.e., remediated) to handle year-2000 (Y2K) dates.

2. Description of the Related Art

Computer systems used in various processing applications, such as processing insurance information, account information, inventory information, investment information, retirement information, as well as many other applications, often operate with records and data containing date-dependent information. In many computing systems, date information relating to years has been represented in two-digit year format, wherein the two digits represent a year between 1900 and 1999. Thus, for example, the digits "98" would represent the year 1998. Popular usage of this simplified date information format throughout the computer industry has resulted in an industry-recognized problem, often referred to as the "year 2000 problem" or the "Y2K" problem.

The problem results from this simplification of date information. Namely, upon the turn of the century (i.e., beginning in the year 2000), two-digit year information intended to represent a year within the twenty-first century (i.e., 2000-2099) will be indistinguishable within such computer systems from a year within the twentieth century (i.e., 1900-1999). For example, a two-digit year value of "08" which is intended to represent the year 2008 will be indistinguishable from the year 1908 by such systems. More specifically, year-2000 problems occur when calculations cross the year-2000 boundary. For example, calculating two years beyond the year 1999 (represented as "99") yields an arithmetically correct result of 101, but a computer program may truncate this to 01 since only two digits have traditionally been allowed. As a further example, the comparison of the year 1999 (represented as "99") against 2000 (represented as "00") may yield the result that a date in the year 1999 is after (i.e., arithmetically greater) than the year 2000.

Various solutions to the "year-2000 problem" have been suggested. Defining the term "year-2000 compliant" as the ability to recognize accurately dates both before and after Jan. 1, 2000, there are essentially four methods of achieving software compliance that have been commonly recognized. They are: (1) date expansion; (2) clock modification; (3) windowing; and (4) date modification. Briefly, described "date expansion" directs a user to survey each computer program and database to identify every location where dates or equivalent data expressions are in use and reformat each instance to use four instead of two digits. "Clock modification" involves changing all years in an existing database and the system clock by deducting 28 years. The reason for the use of 28 is that the calendar resets itself completely every 28 years. The "windowing" technique assumes the century of a two-digit year by comparing it to an arbitrary window of 100 years as defined by a "pivot". (As described below, a pivot is a dividing line between centuries when using two-digit year dates; for example, if the pivot is 1940, then two-digit year dates are assumed to fall in the range 1941-2040.) Finally, "date modification" involves changing the symbolic system used to represent different years so as to accommodate more than the traditional 100 numbers in the two digits allocated for that purpose. For example, letters of the alphabet can be selectively substituted for numbers to expand the representation of the two digits.

The commonly owned, copending applications of applicant Brian B. Moore, Ser. Nos. 09/136,833, entitled "METHOD FOR PREDICTING YEAR-2000 INSTRUCTION FAILURES"; 09/136,279, entitled "SYSTEM FOR PREDICTING YEAR-2000 INSTRUCTION FAILURES"; and 09/137,465, entitled "PREDICTING YEAR-2000 INSTRUCTION FAILURES", all filed Aug. 20, 1998, and incorporated herein by reference, describe the use of trace analysis to identify year-2000 instruction failures in unremediated programs. Object-code instruction traces are employed to analyze selected instructions of an application program for possible failure when confronted by a year-2000 date. The analysis includes directly identifying one or more instructions of the application program that may fail, as well as identifying whether the one or more instructions have a characteristic of a predefined false-positive failure pattern. A failure-pattern descriptor is assigned to each examined instruction which is indicative of whether the instruction may fail when confronted by a date in the year-2000 range, and whether the instruction is a possible false-positive failing instruction. The analysis employs user-specifiable run-control values, as well as predetermined filter-specification values in comparing traces of each selected object-code instruction to predefined instruction failure patterns.

While the systems described in these copending applications are useful in identifying Y2K failures, they work with unremediated programs and do not identify remediation failures in programs that have already been remediated. Identifying such remediation failures is crucial, however, given the use of outsourcing to remediate programs. Thus, companies often send programs to independent remediators who remediate the programs using source tools, but do not give the remediators databases that allow the updated programs to be fully tested.

What is needed, therefore, are tools that independently validate or verify the proper functioning of programs that have been updated to handle year-2000 dates (i.e., after the remediated programs are received back at the originating company). Presently, however, there seem to be no tools available for this purpose.

SUMMARY OF THE INVENTION

In general, the present invention contemplates a method and apparatus for identifying remediation failures in a computer program comprising a sequence of instructions that has been remediated for year-2000 (Y2K) instruction failures in accordance with a predetermined remediation model. In accordance with the invention, a trace file is generated of the program containing a trace record of each execution instance of selected instructions susceptible to remediation failure. The trace records are compared with failure patterns characteristic of known types of remediation failures to generate an output listing of potential remediation failures. Specific remediation models and failure patterns associated with such models are described below.

The present invention complements remediation efforts by providing an independent validation and verification tool. Preferably, it identifies failures associated with standard remediation models as well as common remediation issues associated with unremediated programs. Preferably, it allows a user to affect the analysis by setting run-time control values that reflect individual aspects of the application being tested.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which:

FIGS. 7 and 8 illustrate examples of Y2K, XYI, and EOC ranges.

BEST MODE FOR CARRYING OUT THE INVENTION

As introduced above and explained in detail below, this invention provides a technique for analyzing object-code instructions of an application program employing trace records accumulated from execution of the instructions. By analyzing object-code instruction traces, instructions in remediated programs that have a remediation-failure potential are directly identified. An analysis in accordance with this invention identifies instructions having probable remediation failures and provides a remediation identifier for each such instruction. The remediation identifiers reference a table of remediation-failure-pattern descriptions. In an embodiment described herein, these remediation-failure-pattern descriptions include a characterization of the remediation-failure potential as well as the remediation model that defines the problem. The remediation identifiers and other execution summary information (described below) can then be employed, for example, by a verification team, to verify that an application program has been properly remediated and return the remediated application to production.

Figure 1:
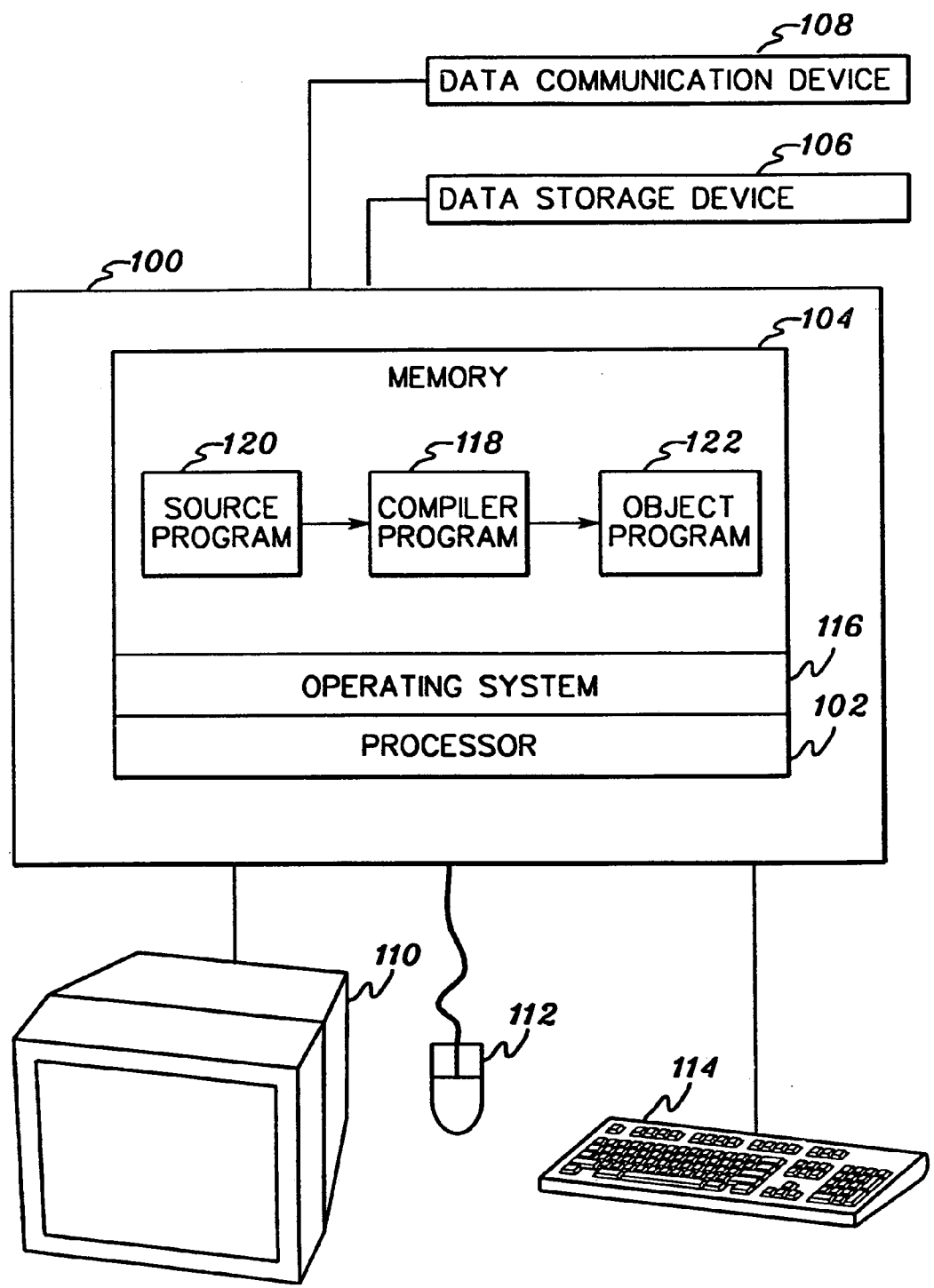
FIG. 1 is an exemplary hardware environment which can be used to implement the preferred embodiment of the present invention.

One example of a computer environment incorporating and using a diagnostics capability in accordance with the present invention is depicted in FIG. 1. Embodiments of the present invention may be implemented using a computer 100, which generally includes, inter alia, a processor 102, a random access memory (RAM) 104, data storage devices 106 (e.g., hard, floppy, and/or CD ROM disk drives, etc.), data communications devices 108 (e.g., modems, network interfaces, etc.), a monitor 110 (e.g., CRT, LCD display, etc.), a mouse pointing device 112 and a keyboard 114. It is envisioned that, attached to computer 100 may be other devices such as a read-only memory (ROM), a video card, a bus interface, printers, etc. Those skilled in the art will recognize that any combination of the above components, or any number of different components, peripherals, and other devices, may be used with computer 100.

Computer 100 typically operates under the control of an operating system 116, such as the OS/390, AIX, or MVS operating systems offered by International Business Machines Corporation. Computer 100 may further operate under the control of a program, such as source or application program 120, to perform various tasks which may involve date-dependent information as described herein. The application program is compiled by a compiler 118, which is a computer program that translates the source program into an equivalent object-code program 122.

The source language may be, for example, a high-level language like COBOL, PL/I, C++, or a lower-level language such as ASSEMBLER, and the object language is the machine language of the computer. The translation of the source program into the object program occurs at compile-time, while the actual execution of an object program occurs at run-time.

A compiler performs an analysis of the source program and then performs a synthesis of the object program, wherein it first decomposes the source program into its basic parts and then builds the equivalent object program parts from the source program parts. As a source program is analyzed, information is obtained from, for example, procedural statements, such as loops and file I/O statements.

Compilers for the COBOL, PL/I, and C++ programming languages and assemblers are well-known in the art, as are run-time environments for a computer program based on these languages.

Figure 2:
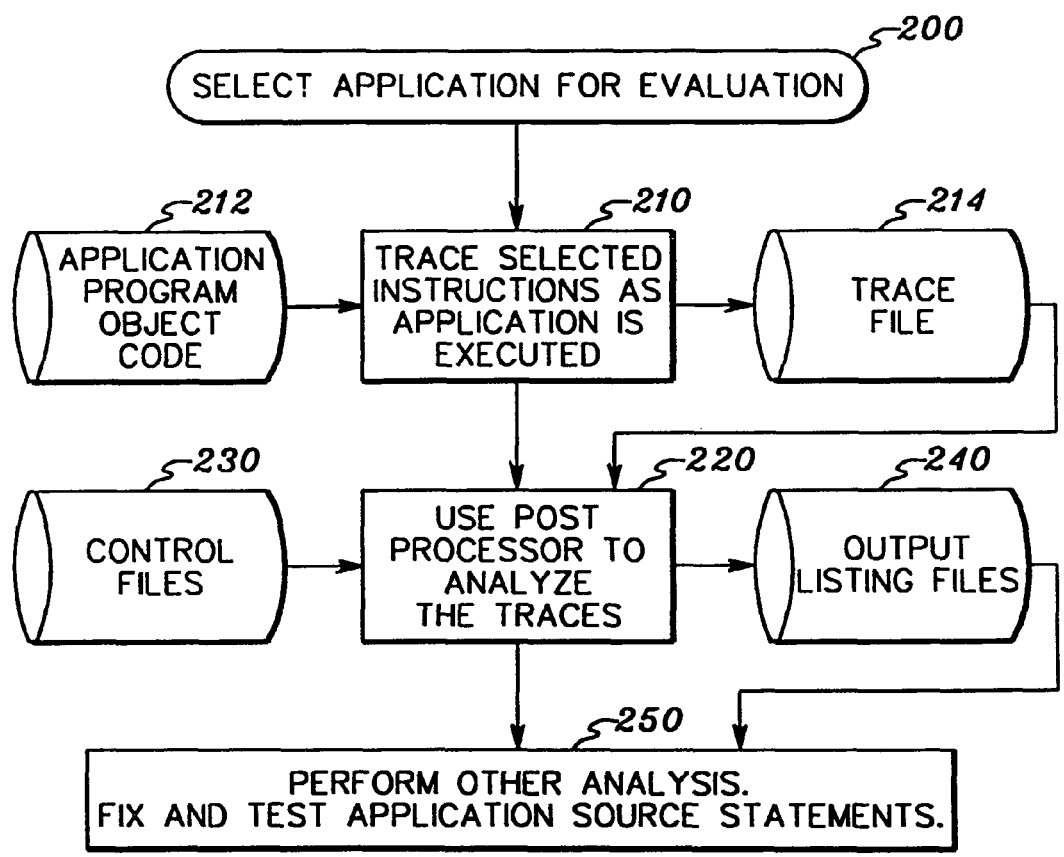
FIG. 2 depicts a process of one embodiment for identifying remediation problems in accordance with the present invention.

FIG. 2 presents one overall embodiment of a process for identifying remediation failures using analysis techniques in accordance with the present invention (herein comprising a mechanism referred to as the "post-processor"). Processing begins by a user or year-2000 remediation team selecting an application program for evaluation for remediation failures 200. A trace program is used to trace one or more selected instructions in the application program 210. The application program is provided in object-code format 212 and output of the trace processing produces a trace file 214.

Facilities that trace the execution of programs have existed for many years. Basic functions appeared with the "single-step mode" of early computers (e.g., the IBM S/360, Model 40) and the trace function of the IBM Virtual Machine (VM) operating system. More recently, advanced facilities have been incorporated into tracing programs and machine hardware. Some recent developments are described by Thomas Ball and James R. Larus in "Optimally Profiling and Tracing Programs", *Conference Record of the 19th ACM Symposium on Principles of Programming Languages*, NY ACM Press, 1992 (pages 59-70); by Jim Pierce and Trevor Mudge in "IDtrace—a tracing tool for i486 Simulation", *Proceedings of the IEEE International Workshop on Modeling, Analysis, and Simulation of Computer and Telecommunications Systems* 1994, IEEE Service Center, Piscataway, N.J. (pages 419-420); and U.S. Pat. No. 5,446,876, entitled "Hardware Mechanism for Instruction Data Tracing."

It is assumed, for the purposes of this document, that a trace program has observed the U instruction-by-instruction execution of the compiled application program and written trace records for each selected instruction to a trace file. It is further assumed that the instructions mentioned in the description of the instruction selectors (described below) were traced. One of ordinary skill in the art can produce such a trace file using straightforward modifications to any one of a number of currently available tracing facilities. A preferred trace program is the IBM Runtime Analyzer for MVS and OS/390, available from the assignee of the present application.

The trace-output file contains one record for each execution instance of an instruction that is selected for tracing. Thus, if a selected compare logical (CLC) instruction is executed 1000 times, it produces 1000 trace records.

Preferably, the trace record for an instruction instance contains the instruction text, the register values used by the instruction, the values of the storage operands fetched by the instruction, the names of the load-module and control section (CSECT) for the program containing the instruction, and the offset of the instruction within its program. Concatenating the names with the program offset identifies the instruction for the purposes of the post-processor.

The trace record for a compare instruction also indicates whether the instruction is followed by a branch-on-equal or branch-on-not-equal.

The trace-output file is referred to as the "trace file" 214 in FIG. 2, where it is used as an input file for the post-processor 220.

In accordance with the present invention, year-2000 failures have been found to occur in subtract, compare, add, multiply and divide instructions, and therefore, these instructions are initially selected for tracing. Along with trace file 214, control files 230 are provided to the post-processor 220 for use in analyzing the traces. These control files allow a user to edit or set execution parameters for the post-processor run. For example, if the user knows that for a given application program end-of-century (EOC) dates must have occurred only after 1961, then end-of-century could be set to 61. Once the trace and control files are provided, the post-processor 220 is invoked to analyze the trace records and predict which object-code instructions might fail when processing dates in the year-2000 (Y2K) range. The post-processor 220 is described further below in connection with FIGS. 3-8.

Post-processor output files 240 summarize the values processed by all the execution instances of each application instruction that is deemed, e.g., to have high remediation-failure potential. Each instruction is assigned an identifier that references a catalog of failure-pattern descriptions. This post-processor output then requires further analysis by the year-2000 fix team to identify statements within the application source code that must be changed in order to bring the application into year-2000 compliance 250. The catalog of failure descriptors and the instruction summaries 240 provided by the post-processor 220 (in accordance with this invention) are used in this step.

The following is a high-level summary produced by the post-processor 220:

| TEST COVERAGE | |
|---|---|
| 99.2% | OF TRACE-ELIGIBLE INSTRUCTIONS WERE EXECUTED AND TRACED (PER LISTINGS) |
| 1,744 | LISTED INSTRUCTIONS ARE TRACE-ELIGIBLE |
| 1,731 | LISTED INSTRUCTIONS WERE TRACED |

| YEAR-2000-FAILURE SUMMARY | |
|---|---|
| 104 | INSTRUCTIONS HAVE HIGH Y2K-FAILURE POTENTIAL (Y2K-SUM.LISTING) |
| 65 | INSTRUCTIONS HAVE MEDIUM Y2K-FAILURE POTENTIAL (MIX-SUM.LISTING) |

| REMEDIATION SUMMARY | | |
|---|---|---|
| 152 | INSTRUCTIONS HAVE REMEDIATION ISSUE OR FAILURE ASPECTS (REM-HI.LISTING) | |
| 24 | ISSUE | DESIGNATIONS |
| 25 | CASE-MODEL | DESIGNATIONS |
| 20 | Y3-MODEL | DESIGNATIONS |
| 19 | COMMON-Y4-MODEL | DESIGNATIONS |
| 20 | Y4-Y2-MODEL | DESIGNATIONS |
| 3 | Y4-MODEL | DESIGNATIONS |
| 49 | LINEAR-MODEL | DESIGNATIONS |

The summary is for a program whose remediated and unremediated date-processing routines test and demonstrate the capabilities of the post-processor 220. Its counts and ratios are atypical.

If a COBOL listing for the traced program is supplied, test coverage is summarized in terms of the trace-eligible instructions that were actually traced. S/390 compare, subtract, add, multiply, and divide instructions are eligible for tracing (CLC, CP, C, CR, CH, CL, CLR, SP, S, SR, SH, SL, SLR, AP, A, AR, AH, AL, ALR, MP, M, MR, MH, DP, D, and DR).

Trace-eligible instructions in paths that were not traversed are listed to help assess test coverage. Part of a "no-coverage" report shows a COBOL statement that generated a subtract (SP) instruction which was not executed:

```
Cobol: 002763              SUBTRACT 127 FROM J3-Y3 GIVING INT-YY
00D210   FB21   DE2D   8AF3   SP   3629(3,13),2803(2,8)   TS2 = 21   PGMLIT   AT   +1754
```

One may want to add test cases that will cause untraversed paths to be covered in subsequent trace runs.

Remediation Issues and Remediation Failures

The post-processor 220 identifies remediation issues in unremediated programs—for example, existing dates fall before a contemplated pivot; instructions that will fail when processing Y2K dates also encounter inputs that are not valid dates, suggesting that exceptions must be handled; or certain instructions process dates that have unique meaning (e.g., 99365 means "never expires").

The post-processor 220 can help find oversights in remediated programs—for example, residual Y2K failures caused by omitting remediation logic, problems introduced by transforming special dates for processing by remediated routines that provide no special handling, cases where 9s complement values are not treated as dates, or situations where leap-year logic may mishandle 2000 (which is a leap year despite being a multiple of 100).

The post-processor 220 can help one audit "Y2K-ready" programs by revealing what may be failures with respect to standard remediation models:

Linear model: Gregorian or Julian dates in databases are replaced by sequential numbers (e.g., linear date 0 represents Jan. 1, 1960; linear dates span −20,219 (Jan. 1, 1880) to 25,567 (Dec. 31, 2029)). Linear dates may be compared, and day intervals may be added to or subtracted from them, but routines that add month or year intervals or that calculate ages in years, months, and days first convert linear dates to Gregorian form.

Y2-case model: Two-digit years (Y2) remain in databases and the program handles dates using case logic. For example, dates are compared only when both are above or both are below the pivot; when dates straddle the pivot, the one above the pivot is earlier.

Y3-offset model: three-digit-year (Y3) offsets from 1900 are created by adding 100 to Y2 values that are below the pivot—dates are then processed without case logic. Y3 dates should stay within the 100-year range defined by the pivot (e.g., 041-140 for a pivot of 1940) so that they can be reduced unambiguously to Y2 form when stored in existing databases.

Y4-Y2 model: Y2 values are windowed to four-digit years (Y4) using a pivot to insert century values (19, 20). Y4 dates should stay within the 100-year range defined by the pivot (e.g., 1941-2040 for a 1940 pivot) so that they can be reduced unambiguously to Y2 form when stored in databases.

Y4 model: databases are expanded to hold Y4 dates. The dates range within a user-defined interval (e.g., 1880-2029) for testing purposes.

The post-processor 220 cannot find all possible failures. For example, it misses cases where a day from a Julian two-digit-year date (OLD-YYDDD) is mistakenly mixed with a year from an expanded date (NEW-YYYYDDD); and it can't determine that a windowed date is still initialized to a value appropriate to 1900-99 instead of 1941-2040.

Potential remediation problems are identified by matching instruction input streams to patterns that are typical of known remediation errors. Instructions that process year-only (YY, YYY, YYYY), Gregorian (YYMMDD, YY/MM/DD, YYYMMDD, YYY/MM/DD, YYYYMMDD, YYYY/MM/DD), Julian (YYDDD, YY/DDD, YYYDDD, YYY/DDD, YYYYDDD, YYYY/DDD), or linear dates are flagged when the dates conform to one of the following patterns.

Some remediation concerns apply to both unremediated and remediated routines. A general remediation issue is indicated when:

The execution instances of an instruction compare a constant date that was not designated as a pivot, but that has pivot-like form (YY1231, YY0101, YY365, YY366, or YY001), to other dates. This suggests that conflicting pivots may be created by remediation, or that they exist in remediated routines.

The instances of a compare, subtract, or add instruction encounter special dates directly or after they have been transformed for the Y3, Y4, or linear model. This suggests that special dates are being processed by remediated routines, perhaps without realizing that they require unique handling.

One specifies the pivot and dates that have special meaning, as described below.

A remediation failure with respect to the linear model is indicated when:

A compare, subtract, or add instruction that processes linear dates encounters inputs that are outside a user-defined validity range and for compare, it is not followed by a branch-equal or branch-not-equal. Or an instruction that divides linear dates by 7 or 36525 (e.g., to obtain day names or convert to Gregorian form) encounters invalid inputs.

A compare, subtract, or add instruction that processes linear dates encounters dates that are not in the 100-year range defined by the pivot (e.g., 1919-2018 when the pivot is 1918) and for compare, it is not followed by a branch-equal or branch-not-equal; or an instruction that divides linear dates by 7 or 36525 encounters dates that are not in the 100-year range. When test cases are limited to EOC and Y2K dates, such instructions raise the possibility that faulty dates were produced by remediated routines.

An instruction adds to or subtracts from linear dates, and some results fall below the EOC range but above 1,096. Such results are not day intervals in a 3 year span; when one's tests use only EOC and Y2K dates, they suggest that remediated routines produced faulty dates.

An instruction adds to or subtracts from linear dates, and some results are above 1,096 but outside the 100-year range defined by the pivot. When one's tests are limited to EOC and Y2K dates, this suggests that remediated routines produced faulty dates.

A remediation failure with respect to the Y2-case model may occur when:

An instruction compares dates containing two-digit years, some dates straddle the pivot, and the instruction is not followed by a branch-equal or branch-not-equal. This suggests an omission of case logic.

A compare, add, subtract, or divide instruction that processes dates containing two-digit years encounters invalid dates; and for compare, it is not followed by a branch-equal or branch-not-equal. This may occur because exceptions exist in unremediated routines, or because dates are mishandled in remediated routines.

A remediation failure with respect to the Y3-offset model is indicated when:

A compare, add, subtract, or divide instruction that processes dates containing Y3 offsets encounters inputs that are outside the 100-year range defined by the pivot; and for compare, it is not followed by a branch-equal or branch-not-equal. This suggests that pivot logic was not always applied or that some dates will be converted ambiguously to Y2 form when stored in databases (e.g., when the pivot is 1940, Y3=100 (2000)+41 years gives 141 (2041), which is stored in a database as 41 (representing 1941)).

An instruction adds to or subtracts from dates containing Y3 offsets, and some results are above the 100-year range defined by the pivot (e.g., 041-140 for a 1940 pivot). This suggests that ambiguous Y3 values were generated.

A compare, add, subtract, or divide instruction that processes dates containing Y3 offsets encounters invalid dates; and for compare, it is not followed by a branch-equal or branch-not-equal. This suggests that dates have been mishandled by a remediated routine.

An instruction compares Y3 values to 100 (meaning 2000) to make a leap-year determination, but the routine does not treat 100 as a leap year. For example, remediation changed Y2 values to Y3 offsets in a routine that did not treat 00 as a leap year.

An instruction divides a three-digit year (Y3) by 4 to make a leap-year determination, and Y3 sometimes is 100. The routine must be examined to determine whether the year 2000 is handled properly.

A remediation failure with respect to the Y4-Y2 model is indicated when:

A compare, add, subtract, or divide instruction that processes dates containing Y4 values encounters inputs that are outside the 100-year pivot range; and for compare, it is not followed by a branch-equal or branch-not-equal. These dates may be converted ambiguously to Y2 form when stored in databases (e.g., when the pivot is 1940, 2000+41 years gives Y4=2041, which is stored in a database as 41 (representing 1941)).

An instruction adds to or subtracts from Y4 dates, with some results above 199 but outside the 100-year range defined by the pivot (e.g., 1941-2040 for a pivot of 1940). The result is neither a valid date nor a valid interval.

A compare, add, subtract, or divide instruction that processes Y4 dates encounters invalid dates; and for compare, it is not followed by a branch-equal or branch-not-equal. This suggests that dates have been mishandled in a remediated routine.

An instruction compares Y4 values to 2000 to make leap-year determinations, but the routine fails to treat 2000 as a leap year. For example, remediation changed Y2 dates to Y4 dates in a routine that did not flag 00 as a leap year.

An instruction divides four-digit years by 4 or 100 to make leap-year determinations, and Y4 is sometimes 2000. The routine must be examined to determine whether 2000 is handled properly.

A remediation failure with respect to the Y4 model is indicated when:

A compare, add, subtract, or divide instruction that processes dates containing four-digit years (Y4) encounters inputs that are outside a user-defined validity range; and for compare, it is not followed by a branch-equal or branch-not-equal. This suggests that erroneous Y4 values were generated.

An instruction adds to or subtracts from Y4 dates, and some results fall above 199 but outside a user-defined validity range (e.g., 1900-2099). The result is neither a valid date nor an interval.

Remediation issues and potential remediation failures are displayed using remediation ids that reference information in a catalog, as described below.

Remediation information is placed in two files. REM-HI.LISTING summarizes the values processed by each instruction that has high remediation-failure potential. If a COBOL program is traced, and a listing for the program is supplied, then the COBOL statement that produced each instruction is shown, at least in part.

A display for a compare (CLC) instruction (reproduced below) shows its load-module and CSECT (SUITE17), its CSECT offset (7EEA hex) and text (D503 . . . hex), its COBOL statement, a remediation id and analysis (4BAAX: Y2-case model . . . ), a summary of the tests that were made (compare Gregorian dates containing two-digit years (G2)), input ranges and histograms, and notes that both input streams fit date patterns with dates in the Y2K and EOC ranges (but none in the excluded year interval (XYI) that separates them). The dates straddled a pivot in ten execution instances (Cross Piv=10), special dates were among the inputs (Op1 Sp Dat=2 and Op2 Sp Dat=1), and invalid dates were encountered (Invalid Op=3). The valid inputs were true dates in packed-decimal form. (Since the instruction also matched a Y2K-failure pattern (Y2K fail=10), a catalog id 1AAAX and a Y2K-failure analysis also appear.)

The post-processor output files are analyzed by a remediation team to winnow out false positives and identify any "true positives" that were missed. This is done using source-based tools or by examining the source directly. The runtime analyzer and post-processor augment a Y2K remediation effort, but they do not permit one to dispense with other remediation tools.

A post-processor 220 in accordance with the present invention preferably recognizes true dates and nines-complement dates; Julian, Gregorian and linear dates, with and without embedded separators; dates in zoned-decimal, packed-decimal, and binary formats; and dates contained in main-storage operands that are up to 18 bytes long.

Further, the user is preferably able to specify the Y2K range, the EOC range, the characters that are recognized as embedded separators within Julian and Gregorian dates, the range of valid four-digit years (i.e., Y4 LOW LIMIT and Y4 HIGH LIMIT as defined below), LINEAR DAY 0, the pivot value, special Gregorian and Special Julian dates, and date types for which Y2K and remediation information is to be suppressed. This is done based on knowledge of the applications that are to be analyzed.

Catalog ids indicate Y2K-failure potential; remediation ids suggest remediation issues or failures; and descriptors characterize the input streams of date-processing instructions. The ids and descriptors are used in output displays; the catalogs in this chapter add information to what appears in the displays.

Each instruction is assessed as to Y2K-failure and remediation-failure potential relative to each filter. A catalog id and a remediation id are assigned to the instruction-filter pair. The catalog ids are not shown here, since they relate to original Y2K failures rather than to the remediation failures to which the present application is directed. The remediation ids used are shown in Table 1 below.

In the table below, the "s" at the front of an id stands for a severity indicator. Ids starting with 4 suggest high remediation-failure potential and place the instruction display in REM-HI.LISTING.

Ids starting with 5 suggest lesser failure potential or informational content. The second character indicates which remediation model defines the problem: A for general issues, B for the Y2-case model, C for the Y3-offset model, D for issues that are common to the Y4-Y2 and Y4 models, E for the Y4-Y2 model, F for the Y4 model, and G for the linear model. The "p" at the end of an id stands for an indication of how many instances passed the filter.

```
S/390: SUITE17 .SUITE17 .007EEA.        CLC   D503DE28DE30.           49 execution instances
  Cobol: 001430      IF   OLD-DATE-6 < LL-G2 THEN                                              LIST01 line 012627
  (4BAAX    rem id)  Y2-case model. Compare and some dates straddle the pivot
  (1AAAX    cat id)  High y2k-failure potential. Apparent y2k failures.
  G2 filter passed 93.8% (         46):            'G2 ? G2 Dec CLC Gregorian'     (FIL# 10)
     --- Input Ranges --- Decade      00  10  20  30  40  50  60  70  80  90.              Y2k% XYI% EOC%
  D1   000501+ to    991231+ YY %     11                        9   13  26  41. Date pattern   11        89
  D2   000501+ to    991231+ YY %     28                            70          2. Date pattern 28       72
  >        Y2k fail       Fut fail    True dates   9s comp  10s comp   Pack dec   Zone dec Separator
  >            10             32           46                              46
  >>       Cross Piv     Invalid Op    Op Piv Ex   Op1 Sp Dat   Op2 Sp Dat
  >>           10              3                        2            1
```

In attempting to identify all remediation problems, false positives are also flagged. Some instructions that match failure patterns will not, in fact, produce incorrect or unexpected results in practice.

The following are some examples of remediation-catalog ids. "4CRSA" flags a subtract or add instruction that processes Y3-offset inputs, some of which are above 99, where some results fall outside the 100-year window defined by the pivot. "4ALTA" flags an instruction that compares dates containing two-digit years to a possible conflicting pivot value (e.g., 32/12/31 when the designated application pivot is 40/12/31). "4ASCA" flags an instruction that compares dates containing two-digit years to a value that is designated as a special date.

2. It permits the user to affect the analysis by setting run-time control values that reflect individual aspects of the application being tested.

3. It assigns special flags that help to winnow out false positives instead of merely identifying instructions that seem to

TABLE 1

Remediation ids

| Id (1) | Instructions, Qualifying Attributes, and Comment |
|---|---|
| sACPp | Information. Compare dates to a pivot value. Suggests the presence of remediation, but is probably not a remediation issue. |
| sADIp | Remediation issue. Some invalid dates or intervals as inputs; suggests exceptions to be handled. |
| sALTp | Remediation issue. Compare to potential alternate pivot. |
| sAMIp | Remediation issue: Y3 or Y4 model, some invalid intervals. |
| sAMNp | Remediation issue: Y3 or Y4 model, multiply, some interval magnitudes >99, and some intervals <0. |
| sASDp | Special date containing two-digit year among the inputs and no other remediation id could be assigned. |
| sBAAp | Y2-case model: Compare non-pivot dates and some of them straddle the pivot. |
| sBJSp | Y2-case model: Some invalid J2 dates, but valid dates all small (1-200) so perhaps not J2 variable. |
| sBJ4p | Y2-case model: Some invalid J2 dates, but valid inputs also valid Y4 values below 2000. |
| sCCCp | Y3 model: Compare Y3s to 100. Examine program to see if leap-year test and Y3 = 100 (year 2000) handled properly. |
| sCDAp | Y3 model: Some Y3 inputs above 100 and some outside 100-year pivot range. |
| sCDFp | Y3 model: No Y3 inputs above 100 but some outside 100-year pivot range; may be Y2 or Y3 variable. |
| sCDIp | Y3 model: Some Y3 inputs above 100 and some invalid; suggests exceptions to be handled. |
| sCD3p | Divide, filter for three-digit-year (Y3) offsets, dividend sometimes 100, and divisor = 4. Seen in leap-year-determination routines; examine the program to see if Y3 = 100 (2000) handled properly. |
| sCHFp | Information: Y3 filter, no failure predicted, more Y3 inputs than Y2. Probably Y3 variable, not Y2. |
| sCHHp | Compare, both operands always 100. Based on false positive in return-code test, but may be Y2K failure. |
| sCIFp | Y3 model: No Y3 inputs above 100 but some invalid; may be Y2 or Y3 variable. |
| sCRSp | Y3 model: Subtract or add with date and some results above 100-year pivot range. |
| sCSCp | Y3 model. Compare to special-date constant, perhaps to branch to exception handler. |
| sCSDp | Y3 model. Special date containing three-digit-year offset among the inputs and no other remediation id could be assigned. |
| sDCCp | Y4 models: Compare Y4s to 2000. Examine program to see if leap-year test and 2000 handled properly. |
| sDDIp | Y4 models: Some inputs valid and others invalid. Suggests exceptions to be handled. |
| sDD4p | Divide, filter for four-digit years (Y4), dividend sometimes is 2000, and divisor = 4, 100, or 400. Seen in leap-year determination; examine the program to see if 2000 handled properly. |
| sDSCp | Y4 models. Compare to special-date constant, perhaps to branch to exception handler. |
| sDSDp | Y4 models. Special dates containing four-digit years among the inputs and no other remediation id could be assigned. |
| sEDAp | Y4-Y2 model: Some Y4 inputs outside 100-year pivot range. |
| sER2P | Y4-Y2 model: Subtract or add with date, and some results outside 100-year pivot range but above 199. |
| sFR4p | Y4 model: Subtract or add with date, and some results outside overall Y4 range but above 199. |
| sGDIp | Linear model: Some invalid inputs -- exceptions to be handled? |
| sGDAp | Linear model: Some inputs outside 100-year pivot range. |
| sGRPp | Linear model: Subtract or add, some results fall above 1,096 but outside the 100-year range defined by the pivot. The result is neither a valid date nor an interval-in-days in the 0-3 year range. |
| sGR4p | Linear model: Subtract or add, some results above 1,096 but outside the range-of-validity for linear dates. The result is neither a valid date nor an interval-in-days in the 0-3 year range. |
| sGXCp | Linear model: Subtract or add, some results fall in the (translated) excluded year interval (XYI). |

Another set of advantages of the present invention derive from its "ease of use" and scope:

1. It runs as a normal TSO application on any IBM S/390 machine. Thus, many members of a remediation team can perform analysis runs at the same time.

process date variables. This helps to expedite the analysis task that is left to the remediation team.

4. It identifies failures associated with performing arithmetic or comparisons on full Julian, Gregorian and linear-date variables, instead of merely focusing on two-digit year variables. Thus, a wider set of failures can be identified.

5. It identifies failures in compare, subtract, add, multiply and divide instructions, as well as compare logical (CLC) instructions that compare zoned-decimal, packed-decimal, and binary operands. Again, a wider set of failures can be identified.

Figure 3:
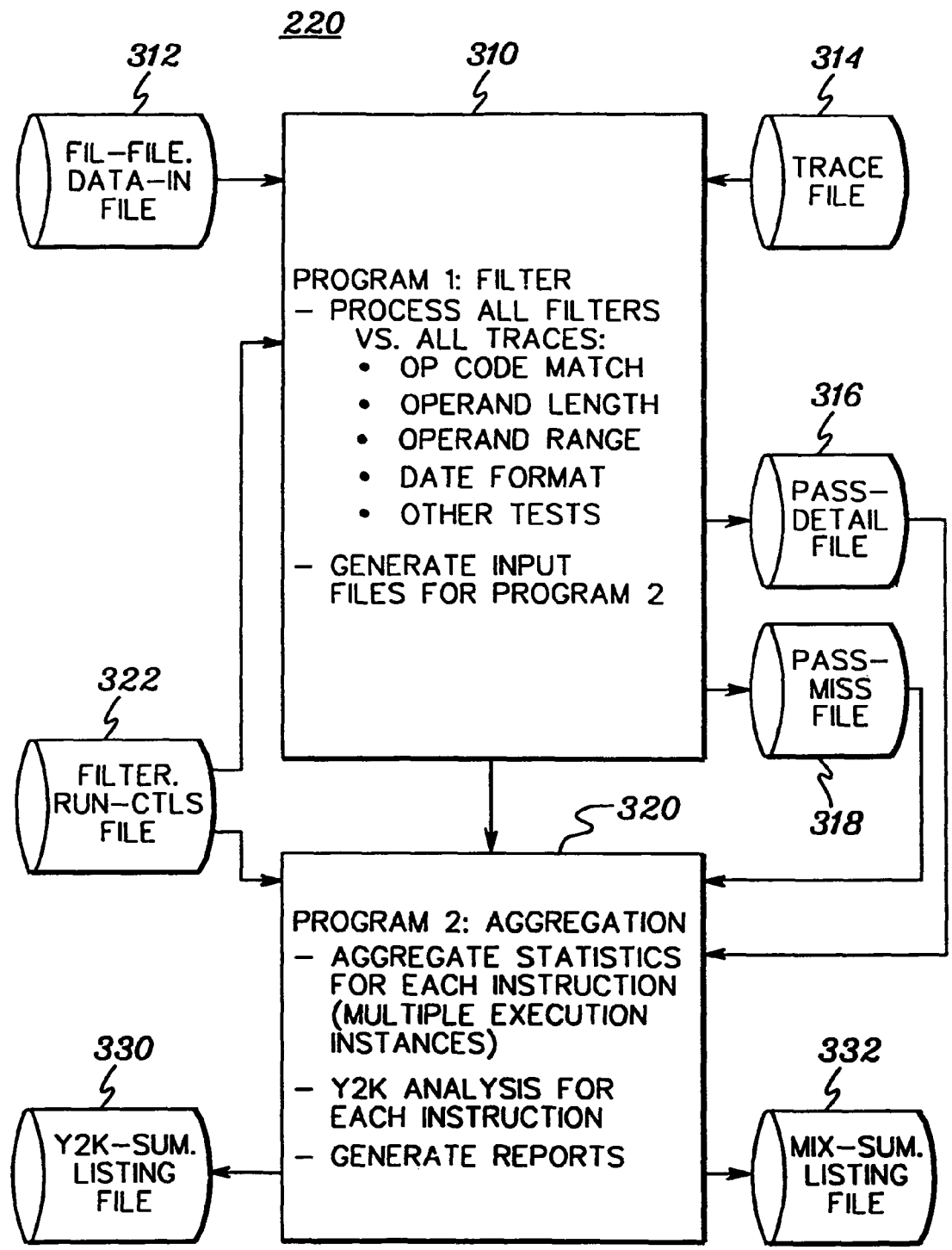
FIG. 3 depicts one embodiment of the post-processor analysis step of FIG. 2 in accordance with the present invention.

FIG. 3 presents one embodiment of a post-processor 220 in accordance with the present invention. Processor 220 includes a first, filter routine 310 and a second, aggregation routine 320 as described hereinbelow. Filter program 310 processes one or more filters and compares the filters to all trace records of the trace file. A filter may look for an op code match, an operand length, an operand range, a date format or other tests, and generates therefrom input files 316, 318 which are used for the aggregation program 320. The aggregation program analyzes these files and aggregates statistics for each instruction (i.e., assuming multiple execution instances). Specifically, Y2K analysis for each instruction is performed and reports are generated.

By way of example, in one embodiment filter program 310 receives as input a filter file (FIL-FILE.DATA-IN) 312, as well as a run-control file (FILTER.RUN-CTLS) 322 and a trace file 314 (as described above). The FIL-FILE.DATA-IN file and FILTER.RUN-CTLS file are described below. Although FIL-FILE.DATA-IN is implemented as an external file 312 in the embodiment shown, it could also be implemented as an internal table of the filter program 310 if it were desired to protect the information from user changes.

FIL-FILE.DATA-IN

The filter-input file contains filter specification records. For example, the fields in each filter might be as discussed below.

1. RULE-ID and COMMENT: Bytes 2-17 and 44-52 contain identifiers that are used in output files produced by the post-processor 220.
2. FILTER FLAGS: Bytes 19-26 contain the hex representation of 32 flags that specify the filtering rules. The flags are summarized in Table 2 below.
3. L1 LL and L1 UL: Bytes 28-29 and 31-32 contain decimal values that specify lower and upper limits on the lengths of first operands of compare logical (CLC) and decimal instructions. Instructions must have first operand lengths in this range in order to pass the filter.
4. L2 LL and L2 UL: Bytes 34-35 and 37-38 contain decimal values that specify lower and upper limits, respectively, on the lengths of second operands of decimal instructions. Instructions must have second operand lengths in this range in order to pass the filter.
5. LINEAR INDEX: Bytes 40-42 contain a tag that designates a user-defined sequence of linear dates.

Parameters in the FILTER.RUN-CTLS file affect the results produced by the post-processor 220. They are set by the user to fit the application being traced.

The following table shows an example of the contents of a FILTER.RUN-CTLS control file:

| Y2K LIMIT | < | >04 |
|---|---|---|
| EOC LIMIT | < | >55 |
| Y4 LOW LIMIT | < | >1880 |
| Y4 HIGH LIMIT | < | >2029 |
| LINEAR DAY 0 | < | >1960/01/01 |
| LINEAR DAY 0 | < | >1582/10/15 |
| PIVOT | < | >1940 |
| SPECIAL GREG | < | >991231 |
| SPECIAL JULIAN | < | >99365 |
| SEPARATORS | < | >/.-///// |

-continued

| PASS CUTOFF PCT | < | >80 |
|---|---|---|
| COBOL LM-CS 0 | < | >SUITE17 .SUITE17 . |
| PGM-FLAGS | < | >NNNYYYN |
| REM-CTLS | < | >ABCDEFGH |
| OMIT DATE TYPE | < | >J3, J4 |
| SCRATCH | < | >N |

Each line of the FILTER.RUN-CTLS control file is a control specification or a comment. A comment has an asterisk (*) in column 1 and is ignored. A control specification contains a run key left-justified in columns 1-15 and a run value left-justified in columns 21-38; the keys and values are described below:

Y2K LIMIT: A value (00-98) that bounds a "Y2K range". For example, YY values 00-04 mean 2000-04 when 04 is specified.

EOC LIMIT: A value (01-99) that bounds an "end-of-century range". For example, if all dates in a test database are after 1954, set EOC to 55 to cause YY values 55-99 to be treated as meaning 1955-99.

The EOC LIMIT must be greater than the Y2K LIMIT.

Excluded Year Interval (XYI): The interval separating the Y2K and EOC ranges is derived from the Y2K and EOC LIMITS. For example, if the latter are as above, then XYI is 05-54 (meaning 1905-54).

Y4 LOW LIMIT and Y4 HIGH LIMIT: Two bounds for the valid four-digit years. Y4 LOW LIMIT must be before Y4 HIGH LIMIT, and both must lie in the range 1582-2399. For example, specify 1880 and 2029 to cause 1880-2029 to be accepted as four-digit years.

LINEAR DAY 0: A Gregorian date (YYYY/MM/DD) that corresponds to day 0 for a sequence of linear dates. It must fall between Oct. 14, 1582 and Dec. 31, 2399.

Add 1-2 specifications, or omit LINEAR DAY 0 to suppress analysis for linear models. The first LINEAR-DAY-0 value is assigned IDX 1 for use in output displays; the second LINEAR-DAY-0 value uses IDX 2.

For example, if one specifies LINEAR-DAY-0 values of Jan. 1, 1960 and Oct. 15, 1582, and Y4 LOW LIMIT and Y4 HIGH LIMIT are 1880 and 2029:

Valid linear days for IDX 1 are −29,219 (Jan. 1, 1880) to 25,567 (Dec. 31, 2029)

Valid linear days for IDX 2 are 108,555 (Jan. 1, 1880) to 163,341 (Dec. 31, 2029)

PIVOT: A year (1900-1998) that specifies windowing pivots relevant to the application. For example, if the PIVOT is 1940, the pivot values are YY=40 and 41, YYMMDD=401231 and 410101, and YYDDD=40366 and 41001—dates at the end of 1940 and the beginning of 1941.

Outside Pivot Range (OPR): The PIVOT value defines a 100-year range of Y3 and Y4 years; 41-140 and 1941-2040, for example, when the pivot is 1940. These years can be reduced unambiguously to two-digit form for storing in databases; other years generate OPR displays.

SPECIAL GREG and SPECIAL JULIAN: Six-digit and five-digit dates, respectively, that have special meaning (e.g., "never expires") to the application. Remediation information is generated when special dates among the inputs of a date-processing instruction.

SEPARATORS: Characters recognized as embedded separators in Gregorian and Julian dates; use duplicates to reach eight characters. For example, /.-///// designate slash, period, and hyphen as separators.

PASS CUTOFF PCT: A filtering percentage (decimal 00-99). Instructions with passing percentages below the cutoff value are not shown in any instruction-summary file. The severity of a catalog or remediation id, as indicated by its first character, is reduced from 1 to 2 or from 4 to 5 when the percentage of date inputs lying outside the Y2K and EOC ranges exceeds 2*(100—CUTOFF). The catalog-id severity is reduced to 3 when the percentage of dates outside the Y2K and EOC ranges exceeds 3*(100—CUTOFF).

For example, if the cutoff is 80, then instructions that pass a filter in fewer than 80% of the execution instances are not summarized, and the catalog id for an instruction is reduced from 1AAA to 2AAA or 3AAA if more than 40% or 60% of the inputs are in the XYI, respectively.

COBOL LM-CS O or COBOL LM-CS S: Load-module and CSECT names for COBOL programs whose listings are provided. Summaries in output files are related to source statements in the listings, and trace-eligible instructions that were not executed are identified in O-type listings.

One to 10 specifications are added, or COBOL LM-CS is omitted when no listing is provided. COBOL LM-CS O is used for listings that contain source statements and compiled instructions; COBOL LM-CS S is used for short listings whose source statements include instruction information.

The run value contains an eight-byte load-module name, a period, an eight-byte CSECT name, and a final period. The names are the same as those in LOADMOD=and CSECT=parameters of Runtime-Analyzer RANGE statements used in tracing the application.

The load-module and CSECT names in the first COBOL LM-CS specification are associated with the listing designated by the LIST01 DD card of the post-processor JCL; the names in the second specification are associated with the LIST02 DD card; and so on.

PGM-FLAGS: Store "Y" or "N" (yes/no) in each positional flag to control whether the associated sub-program is executed:

4 Filter a trace file to create pass-detail files: the runtime controls are Y4 LOW LIMIT, Y4 HIGH LIMIT, SEPARATORS, LINEAR DAY 0, and OMIT DATE TYPE.
5 Perform Y2K and remediation analysis on pass-detail files: the controls are Y2K LIM, EOC LIM, PASS CUTOFF, PIVOT, REM-CTLS, SPECIAL GREG, SPECIAL JULIAN, and COBOL LM-CS.
6 Identify trace-eligible instructions that were not executed.

One may rerun programs 5-6, without rerunning program 4, if one wants to vary the Y2K LIM, EOC LIM, PASS CUTOFF, PIVOT, REM-CTL, or SPECIAL values.

REM-CTLS: Eight positional characters that specify whether analysis of certain types is placed in REM-HI.LISTING and REM-OTH.LISTING:

Store A in the first run-value position if remediation issues are needed
Store B in the second position if Y2-case analysis is needed
Store C in the third position if Y3-offset analysis is needed
Store D in the fourth position if common Y4-Y2 and Y4 analysis is needed
Store E in the fifth position if Y4-Y2 analysis is needed
Store F in the sixth position if Y4 analysis is needed
Store G in the seventh position if linear-model analysis is needed
Store H in the eighth position if invalid-date analysis is needed
Store any other character in these positions to suppress the related analysis.

OMIT DATE TYPE: Date types for which Y2K and remediation-failure information is not generated. Specify 1-9 types, separated by commas:
Y2 Two-digit years (YY)
G2 Gregorian dates containing two-digit years (YYMMDD)
J2 Julian dates containing two-digit years (YYDDD)
Y3 Three-digit-year offsets (YYY)
G3 Gregorian dates containing three-digit-year offsets (YYYMMDD)
J3 Julian dates containing three-digit-year offsets (YYY-DDD)
Y4 Four-digit years (YYYY)
G4 Gregorian dates containing four-digit years (YYYYMMDD)
J4 Julian dates containing four-digit years (YYYYDDD)

SCRATCH: "Y" causes PASS-DET.DATA-OUT, TRC-SUM.DATA-OUT, and FIL-DATA.DATA-OUT to be emptied at the end of a run. "N" is set if one wants to rerun subprogram 5 without rerunning subprogram 4.

The following table shows the defaults used if values are not specified in FILTER.RUN-CTLS:

| Run Key | Run Value |
| --- | --- |
| Y2K LIMIT | 04 |
| EOC LIMIT | 60 |
| Y4 LOW LIMIT | 1850 |
| Y4 HIGH LIMIT | 2049 |
| LINEAR DAY 0 | No linear dates |
| PIVOT | 1940 |
| SPECIAL GREG | 990000 (invalid date) |
| SPECIAL JULIAN | 99000 (invalid date) |
| SEPARATORS | /.-///// (slash, period, hyphen) |
| PASS CUTOFF PCT | 80 |
| COBOL LM-CS | No listing |
| PGM-FLAGS | NNNNNNN |
| REM-CTLS | ABCDEFGH |
| OMIT DATE TYPE | No date types omitted |
| SCRATCH | Y |

FIGS. 7 and 8 illustrate these examples of Y2K, XYI, and EOC ranges:

| Name | Source | Example 1 | Example 2 |
| --- | --- | --- | --- |
| PIVOT | User-specified | 1940 | 1919 |
| Y2K LIMIT | User-specified | 04 | 10 |
| EOC LIMIT | User-specified | 60 | 80 |
| XYI | Derived from Y2K and EOC LIMITs | 05-59 | 11-79 |
| Y4 LOW LIMIT | User-specified | 1850 | 1850 |
| Y4 HIGH LIMIT | User-specified | 2049 | 2049 |
| Four-digit years (Y4): | | | |
| EOC range | Derived using PIVOT | 1960-1999 | 1980-1999 |
| Y2k range | Derived using PIVOT | 2000-2004 | 2000-2010 |
| XYI | Two parts, derived using PIVOT | 1941-1959 and 2005-2040 | 1920-1979 and 2011-2019 |

-continued

| Name | Source | Example 1 | Example 2 |
|---|---|---|---|
| Pivot range | Derived from PIVOT (100 years) | 1941-2040 | 1920-2019 |
| OPR | Two parts, derived from PIVOT | 1850-1940 and 2041-2049 | 1850-1919 and 2020-2049 |
| Three-digit-year (Y3) offsets: | | | |
| Y3 LOW LIMIT | Derived using Y2K LIM | 005 | 011 |
| Y3 HIGH LIMIT | Derived using Y4 HIGH LIMIT | 149 | 149 |
| EOC range | Derived using PIVOT | 060-099 | 080-099 |
| Y2k range | Derived using PIVOT | 100-104 | 100-110 |
| XYI | Two parts, derived using PIVOT | 041-059 and 105-140 | 020-079 and 111-119 |
| Pivot range | Derived from PIVOT (100 years) | 041-140 | 020-119 |
| OPR | Two parts, derived from PIVOT | 005-040 and 141-149 | 011-019 and 120-149 |

FIG. 7 illustrates a first example of Y2K, XYI, and EOC ranges (Example 1) in which Y2K LIM=04, EOC LIM=60, and PIVOT=1940. FIG. 8 illustrates a second example of Y2K, XYI, and EOC ranges (Example 2) in which Y2K LIM=10, EOC LIM=80, and PIVOT=1919.

TABLE 2

Filter Flags. The eight FILTER FLAG bytes, numbered 1-8, contain character representations for eight corresponding hex values. The valid characters are 0-9 and A-F, representing hex values 0-15.

| Byte | Meaning |
|---|---|
| 1 | Filter type: indicates what type of instructions are passed by the filter. The values and types are: |
| | Value — Filter type |
| | 0 — Compare instructions |
| | 2 — Multiply instructions |
| | 4 — CLC instructions that compare decimal numbers |
| | 6 — CLC instructions that compare binary numbers |
| | 8 — Subtract instructions |
| | A — Divide instructions |
| | C — Add instructions |
| 2 | Unused, must be 0. |
| 3 | Value tests: specifies tests to be performed. The four bits in the hex digit represented by the value-tests byte specify when date testing is performed. The bit values are: |
| | Value — Date test |
| | 0000 — Test only operand 1 for dates. |
| | 0001 — Test only operand 2 for dates. |
| | 0010 — Test both operands for dates. |
| | 0011 — Test that one operand is a date, but the other is not. |
| 4 | Date format: indicates the format of the values that allow an instruction to be passed by the filter. The values and formats are: |
| | Value — Date format |
| | 1 — Two-digit years (YY) |
| | 2 — Gregorian dates containing two-digit years (YYMMDD) |
| | 3 — Julian dates containing two-digit years (YYDDD) |
| | 4 — Four-digit years (YYYY) |
| | 5 — Gregorian dates containing four-digit years (YYYYMMDD) |
| | 6 — Julian dates containing four-digit years (YYYYDDD) |
| | 7 — Three-digit year (YYY) offsets from 1900 |
| | 8 — Gregorian dates containing three-digit year (YYYMMDD) offsets from 1900 |
| | 9 — Julian dates containing three-digit year (YYYDDD) offsets from 1900 |
| | 15 — Linear dates |
| 5 | T/C selector: specifies whether true dates or nines-complement dates are passed: |
| | Value — True or nines-complement date |
| | 0 — Pass true dates only. |
| | 2 — Pass nines complement dates only. |
| | 3 — Pass both. |

TABLE 2-continued

Filter Flags. The eight FILTER FLAG bytes, numbered 1-8, contain character representations for eight corresponding hex values. The valid characters are 0-9 and A-F, representing hex values 0-15.

| Byte | Meaning |
|---|---|
| 6 | All-instructions flag. |
| | Value — Which instructions are tested |
| | 0 — Instructions are tested according to the selector bits in bytes 7 and 8. |
| | 1 — All instructions corresponding to the filter type are tested. |
| 7 | Instruction selectors: The four bits in the hex digit, numbered 0-3 from left to right, are bit-significant controls which are interpreted according to the filter type. Bits 0 and 1 must be zero. Bits 2 and 3 are: |
| | For compare-type filters: |
| | Bit 2 = 1 — Test compare logical (CL) instructions |
| | Bit 3 = 1 — Test compare logical (CLR) instructions |
| | For subtract-type filters: |
| | Bit 2 = 1 — Test subtract logical (SL) instructions |
| | Bit 3 = 1 — Test subtract logical (SLR) instructions |
| | For add-type filters: |
| | Bit 2 = 1 — Test add logical (AL) instructions |
| | Bit 3 = 1 — Test add logical (ALR) instructions |
| | The four bits must all be zero for the other filter types. |
| 8 | Instruction selectors: The four bits in the hex digit, numbered 0-3 from left to right, are bit-significant controls which are interpreted according to the filter type. |
| | For multiply-type filters: |
| | Bit 0 = 1 — Test multiply decimal (MP) instructions |
| | Bit 1 = 1 — Test multiply (M) instructions |
| | Bit 2 = 1 — Test multiply (MR) instructions |
| | Bit 3 = 1 — Test multiply (MH) instructions |
| | For divide-type filters: |
| | Bit 0 = 1 — Test divide decimal (DP) instructions |
| | Bit 1 = 1 — Test divide (D) instructions |
| | Bit 2 = 1 — Test divide (DR) instructions |
| | For compare-type filters: |
| | Bit 0 = 1 — Test compare decimal (CP) instructions |
| | Bit 1 = 1 — Test compare (C) instructions |
| | Bit 2 = 1 — Test compare (CR) instructions |
| | Bit 3 = 1 — Test compare (CH) instructions |

TABLE 2-continued

Filter Flags. The eight FILTER FLAG bytes, numbered 1-8, contain character representations for eight corresponding hex values. The valid characters are 0-9 and A-F, representing hex values 0-15.

| Byte | Meaning |
|---|---|
| For subtract-type filters: | |
| Bit 0 = 1 | Test subtract decimal (SP) instructions |
| Bit 1 = 1 | Test subtract (S) instructions |
| Bit 2 = 1 | Test subtract (SR) instructions |
| Bit 3 = 1 | Test subtract (SH) instructions |
| For add-type filters: | |
| Bit 0 = 1 | Test add decimal (AP) instructions |
| Bit 1 = 1 | Test add (A) instructions |
| Bit 2 = 1 | Test add (R) instructions |
| Bit 3 = 1 | Test add (AH) instructions |
| For CLC-decimal-type filters: | |
| Bit 0 | Must be zero. |
| Bit 1 = 1 | Test CLC instructions with packed-decimal (PD) values |
| Bit 2 = 1 | Test CLC instructions with zoned-decimal (ZD) values |
| Bit 3 = 1 | Test CLC instructions with values containing Julian or Gregorian with imbedded separators (e.g., YY/MM/DD or YY-DDD). |
| Bits 0-3 must be zeros for CLC-binary-type filters. | |

Continuing with FIG. 3, and as noted, filter program 310 provides input files for aggregation program 320. These files, which are labeled pass-detail file 316 and pass-miss file 318, designate whether a given instruction passed at least one filter or missed all of the predefined filters applied against the trace file. This pass-detail file and pass-miss file comprise the base data which is then used by aggregation program 320 to generate the remediation analysis for each instruction. This remediation analysis produces, in one embodiment, a REM-HI.LISTING file 330 and a REM-OTH.LISTING file 332. These files are discussed below using samples from a test run. This test run analyzed a COBOL program, called Suite 15, that contains a concentration of date-processing routines.

TABLE 3

REM-HI LISTING (High Remediation-Failure Potential)

```
S/390: SUITE17 .SUITE17 .007EEA.      CLC   D503DE28DE30.                                                    49 execution instances
 Cobol: 001430    IF   OLD-DATE-6 < LL-G2 THEN                                                                LIST01 line 012627
 (4BAAX    rem id)     Y2-case model. Compare and some dates straddle the pivot
 (3PIVX    cat id)     High y2k-failure potential. Apparent y2k failures.
 G2 filter passed 93.8% (      46):       'G2 ? G2 Dec CLC Gregorian'     (FIL# 10)
   --- Input Ranges --- Decade            00   10   20   30   40   50   60   70   80   90.      Date pattern          Y2k% XYI% EOC%
 D1   000501+ to                           9                                           41.      Date pattern           11     89
 D2   000501+ to   991231+YY %            11                                 9   13   26    2.                         28     72
 >    991231+YY %                         28                                70   46             Separator
 >>   Fut fail                                True dates         9s comp         Pack dec       Zone dec
 >    Y2k fail                                  Op Piv Ex        Op1 Sp Dat      Op2 Sp Dat
 >>   Cross Piv                                                                                 1
 >>                                                                2
       10                Invalid Op       32
                             3
S/390: SUITE17 .SUITE17 .008030.      CLC   D504DE28DE30.                                                    49 execution instances
 Cobol: 001430    IF   G4-OLD < LL-G4 THEN MOVE G4-OLD TO LL-G4 END-IF                                        LIST01 line 012720
 (4DDIX    rem id)     Y4 models. Invalid inputs -- exceptions to be handled?
 G4 filter passed 91.8% (      45):       'G4 ? G4 Dec CLC Gregorian'      (FIL# 29)                          Y2k% XYI% EOC% OPR%
   --- Input Ranges --- Decile        1880 1895 1910 1925 1940 1955 1970 1985  2000 2015                       11   89
 D1   19600101+ to                                                                                                   100
 D2   20020901+YY %                                                   7   29   53   11             .Y4-Y2 dates
 >    19600102+YY %                                                  100                           .Y4-Y2 dates
 D2   Always                                  True dates         9s comp       Pack dec         Zone dec
                                                Op Piv Ex        Op1 Sp Dat    Op2 Sp Dat       Separator
 >                                                                              45
 >>                                                                 2
                         Invalid Op
                              4
S/390: SUITE17 .SUITE17 .00EC46.      CLC   D504DE288D17.                                                    8 execution instances
 Cobol: 003139    IF   J2-DATA <= 68366   THEN                                                                LIST01 line 020603
 (4ALTA    rem id)     Remediation issue. Possible other pivot; pivot conflict?
 (4WENA cat id)        Future-y2k-failure potential or Y2-case-remediation used. YYs in EOC range but none in y2k range.
 J2 filter passed 100.0% (     8):        'J2 ? J2 Dec CLC Julian'         (FIL# 16)                          Y2k% XYI% EOC%
   --- Input Ranges --- Decade            00   10   20   30   40   50   60   70   80   90.                     100
 D1   065087+ to                                                                           100                 100
 D2   068366+YY %                                                                          100
 >    Always                                   True dates         9s comp        Pack dec       Zone dec
                                                 Op Piv Ex        Op1 Sp Dat     Op2 Sp Dat     Separator
 >                                                                  8                                 8
                                                                    2

S/390: SUITE17 .SUITE17 .00EE56.      AP   DFA43DE2BDE30.                                                    10 execution instances
 Cobol: 003166    COMPUTE   J3-IN = G3-NEW + (K1 * 90000) END-COMPUTE                                         LIST01 line 020749
 (4CRSA   rem id) Y3 model. Subtract/add, someY3 >= 100: results above 100-year pivot range.
 G3 filter passed 100.0% (    10):        'I3 ? Y3 + ADD Gregorian'        (FIL# 55)                          Y2k% XYI% EOC%
   --- Input Ranges --- Decile        1880 1895 1910 1925 1940 1955 1970 1985 2000 2015        . Date pattern   100
 D1   090000+ to                     0000 0013 0026  0039 0052 0065 0078 0091 0104 0117        . Date constant   100
 D2   890701+YY %                                                              20    70    10.  Res in XYI
 >    Y2k fail                                True dates         9s comp       Pack dec          Zone dec
                                                 Op Piv Ex                                       Separator
 >                                                                 8                                  1
                                                                                Res Piv Ex Res Inval.
S/390: SUITE17 .SUITE17 .011474.      A    5450AF70.                                                         62 execution instances.
 Cobol: 003837    200-ADD-DAYS     ADD LIN-INTERVAL TO LIN-4.                                                 LIST01 line 023516
 (5GRPA   rem id) Linear model. Subtract/add, some results outside 100-year pivot range but above 1,096 (days)
 Li filter passed 100.0% (     62):       'Li + Days ADD Lin idx 1' IDX= 01  (FIL# 66)                        Y2k% XYI% EOC% OPR%
   --- Input Ranges --- Decile        1880 1895 1910 1925 1940 1955 1970 1985 2000 2015                              50  50
```

TABLE 3-continued

REM-HI.LISTING (High Remediation-Failure Potential)

```
D1  000000+ to     000017+YY%
D2  040176- to     032872+
>
>>                                                                            100
(4GDAX rem id) Linear model. Some inputs outside 100-year pivot range.                   .Date pattern
 Li filter passed 96.7% (        60):      'Days + Li ADD Lin idx 1' IDX= 01             OPR% large day intervals
   -- Input Ranges --- Decile                          (FIL# 67)                     4   Res in XYI
D1  000000+ to     000017+
                        1880    1895   1910  1925  1940  1955  1970  1985  2000  2015
D2  017897- to     021550+YY%                           3                 25    28    7    2
>                  Invalid Op              Op1 Sp Dat                                                     Y2k% XYI% EOC% OPR%
>>                        2                      2                 Op2 Sp Dat                        100    5    13    78    87    3
                                                                           1
S/390: SUITE17 .SUITE17 .0117CE.             C  5920AF90.                                62 execution instances
Cobol: 003882      IF    LIN-4 <= LIN-4-HOLD                                                LIST01 line 023793
(4GDAX rem id) Linear model. Some inputs outside 100-year pivot range.
 Li filter passed 96.7% (        60):      'Li ? Li COM Lin idx 1' IDX= 01
   -- Input Ranges --- Decile                         (FIL# 64)
D1  017897- to     021550+YY%                           3                 25    28   2000   2015
                        1880    1895   1910  1925  1940  1955  1970  1985  2000  2015
D2  017897- to     021550+YY%                           3                 27          15    15
                                                                                                          Y2k% XYI% EOC% OPR%
>   Y2k fail       Fut fail                True dates              9s comp            Pack dec   Zone dec .Dates with exceptions   5   13    78    3
>>                        2               60         4                       1                    Separator  .Dates with exceptions    5   13    78    3
Cobol: 003898     DIVIDE   LIN-4 BY 7 GIVING QUO REMAINDER DAY-IDX-LIN                       DR  1D24.
(4GSCA rem id) Linear model. Invalid inputs -- exceptions to be handled?                  62 execution instances
 Li filter passed 96.7% (        60):      'Li / Li DIV Lin idx 1' IDX= 01                           LIST01 line 023846
   -- Input Ranges --- Decile                         (FIL# 68)
D1  017897- to     021550+YY%                           3                 25    28   2000   2015
                        1880    1895   1910  1925  1940  1955  1970  1985  2000  2015
D2  Always         014609+YY%                           2                       26    16    2.
                                                                                                          Y2k% XYI% EOC% OPR%
>                  Invalid Op              Op Piv Ex              10s comp                                                         5   13    78    3
>>                        2                      2                       1                      Op2 Sp Dat  .Dates with exceptions    5   13    78    3
                                                                                                   .Linear-date divisor
S/390: SUITE17 .SUITE17 .0119F2.             CLC  D503AF70845C.                          57 execution instances
Cobol: 003925      IF    LIN-4 = 14609 THEN CONTINUE END-IF.                                         LIST01 line 023971
(4GSCA rem id) Linear model. Compare for branch to special-date exception handler?
 Li filter passed 100.0% (       57):      'Li ? Li Bin CLC Lin idx 1' IDX= 01
   -- Input Ranges --- Decile                         (FIL# 63)
D1  001827- to     018627+YY%                           3                 25    30   2000   2015
                        1880    1895   1910  1925  1940  1955  1970  1985  2000  2015
D2  Always         014609+YY%                           2                       26          100
                                                                                                          Y2k% XYI% EOC% OPR%
>   Y2k fail       Fut fail                True dates              9s comp       Binary                    .Dates with exceptions    5    12    82    3
>>                        2                      2                       1                         57                 .Date constant                100
                                                                            57
S/390: SUITE17 .SUITE17 .011B02.             SR  1B15.                                  59 execution instances
Cobol: 003940     SUBTRACT   LIN-INTERVAL FROM LIN-4 GIVING LIN-4_TEMP                              LIST01 line 024047
(4GDIX rem id) Linear model. Invalid inputs -- exceptions to be handled?
 Li filter passed 96.6% (        57):      'Li - Li/days SUB Lin idx 1' IDX= 01
   -- Input Ranges --- Decile                         (FIL# 65)
D1  001827- to     018627+YY%                           3                 25    30   2000   2015
                        1880    1895   1910  1925  1940  1955  1970  1985  2000  2015
D2  000000+ to     000017+                              2                       26          2.
                                                                                                          Y2k% XYI% EOC% OPR%
>                  Invalid Op              Op Piv Ex              10s comp                                    .Dates with exceptions   5   12    82
>>                        2                      1                       1                      Op2 Sp Dat   .Day range. OPR% > 1095
```

TABLE 3-continued

REM-HI LISTING (High Remediation-Failure Potential)

```
S/390: SUITE17.SUITE17.0128EA.          S   5B30AFA8.                                                      57 execution instances
Cobol: 004171      SUBTRACT  DAYS-TEMP FROM LIL-DATE GIVING LIL-TEMP.                                                LIST01 line 025183
(4GXCA rem id) Linear model. Subtract/add, some results in XYI.
Li filter passed 100.0% (                57):         'Li - Li/days SUB Lin idx 2' IDX=02     (FIL# 72)
    --- Input Ranges --- Decile                1880    1895    1910    1925    1940    1955    1970    1985    2000    2015           Y2k% XYI% EOC% OPR%
D1    135947+ to   156401+YY%                                                                     28      26      28      16                5     12     82       2
D2   000000+ to   002001+                                                                          2                                    .Dates with exceptions
>>                                                Op1 Sp Dat             Op2 Sp Dat        Res Piv Ex     Res Inval.                    Day range. OPR% > 1095
>>                                                   1                                                                                  Res in XYI
>>                                                                                                                                         1

S/390: SUITE17.SUITE17.013276.          DP   FD20DED88A75.                                                1,128 execution instances
Cobol: 004386      DIVIDE  Y3 BY 4 GIVING QUO REMAINDER REM-4                                                       LIST01 line 025991
(4CD3X rem id) Y3 model. Divide Y3 by 4, some Y3 = 100: examine program to see if leap-year failure when Y3 = 100 (2000).
Y3 filter passed 97.6% (            1,101):           'Y3 / 1 DIV Years'          (FIL# 49)
    --- Input Ranges --- Decile         0000    0013    0026    0039    0052    0065    0078    0091    0104    0117                  Y2k% XYI% EOC% OPR%
D1   000017+ to   000129+YY%                    1               1       4       12      28      51       4         1.                    23       1      75       1
D2   000004+                                                                                                                           Dates with exceptions
>>   Year 2000  Invalid Op     Op Piv Ex                                                                                               Leap-year divisor
>>                   27                  6

S/390: SUITE17.SUITE17.01336C.          DP   FD30DF008A75.                                                1,262 execution instances.
Cobol: 004413      DIVIDE  Y4 BY 4 GIVING QUO REMAINDER REM-4
(4DD4X rem id) Y4 model. Divide Y4 by 4, 100, or 400, and some Y4 = 2000. See if leap-year failure when Y4 = 2000.
Y4 filter passed 97.6% (            1,232):           'Y4 / 4|100|400 D Years'         (FIL# 28)
    --- Input Ranges --- Decile         1880    1895    1910    1925    1940    1955    1970    1985    2000    2015                  Y2k% XYI% EOC% OPR%
D1   001900+ to   002029+YY%                            1       6                        6      41      21        5.                    20       6      67       7
D2   000004+                                                                                                                           Y4-Y2 dates w exceptions
>>   Year 2000  Invalid Op     Op Piv Ex                                                                                               Leap-year divisor
>>                   64                 82

S/390: SUITE17.SUITE17.013A5E.          CLC  D504DF48DF50.                                                180 execution instances.
Cobol: 004514      WHEN  D1 < D2 MOVE "<" TO CC
(4EDAX rem id) Y4-Y2 model. Some Y4 inputs outside 100-year pivot range.
G4 filter passed 98.3% (              177):           'G4 ? G4 Dec CLC Gregorian'            (FIL# 29)
    --- Input Ranges --- Decile         1880    1895    1910    1925    1940    1955    1970    1985    2000    2015                  Y2k% XYI% EOC% OPR%
D1   19300302+ to  80449896+YY%                         1       3        1      7       22      46      23       23                     23             75      3
D2   19240306+ to  80449896+YY%                         1       2        6      6       21      47      23       23                     23             75      3
>>                              True dates          9s comp     10s comp          Pack dec         Zone dec        Separator           .Y4-Y2 dates w exceptions
>>                                   133               42          40              177                                                 .Y4-Y2 dates w exceptions
>>           Invalid Op         Op Piv Ex                       Op2 Sp Dat
>>               3                   5                              4
```

TABLE 4

REM-OTH.LISTING (Lesser Remediation-Failure Potential)

```
S/390: SUITE17 .SUITE17 .0082C4.        CLC   D503DE30DE28.                67 execution instances.
  Cobol: 001486        WHEN   NEW-DATE-6 > PIVOT-G2 AND HL-G2-40 > PIVOT-G2 AND                  LIST01 line 012908
    (5ACPX    rem id)  Information. Compare to pivot; suggests remediation done.
    (3PIVX    cat id)  Compare to pivot with no y2k or future failers. Seen in Y2-case remediation with pivot in XYI.
  G2 filter passed 95.5% (       64):           'G2 ? G2 Dec CLC Gregorian'      (FIL# 10)
      --- Input Ranges --- Decade         00  10  20  30  40  50  60  70  80  90.                Y2k%  XYI%  EOC%
    D1  Always          401231+YY %                       100                . Non-date pattern         100
    D2  000505+ to      991231+YY %       41                          3    9   30   17. Date patte     41    59
    >       Y2k fail         Fut fail     True dates      9s comp    10s comp    Pack dec    Zone dec    Separator
    >                                          64                                    64
    >>      Cross Piv        Invalid Op   Op Piv Ex   Op1 Sp Dat   Opt Sp Dat
    >>          38               3                                     1
S/390: SUITE17 .SUITE17 .00999E.         SP    FB11DE28DE30.                20 execution instances.
  Cobol: 001777        COMPUTE   G3-NEW-Y3 = G3-OLD-Y3 - G3-NEW-Y3 END-COMPUTE                   LIST01 line 014555
    (5CHF     rem id)  Y3 Information. Y3 inputs more frequent than Y2, no other remediation id assigned.
    (3Y3F     cat id)  Y3 Information. Y3 inputs more frequent than Y2, no other catolog id assigned.
  Y3 filter passed 100.0% (     20):             'Y3 - I3|Y3  SUB   Years      '    (FIL# 44)
      --- Input Ranges --- Decile      0000 0013 0026 0039 0052 0065 0078 0091 0104 0117         Y2k%  XYI%  EOC%  OPR%
    D1  000060+ to      000102+YY %                           5         25   70       . Date pattern   10        90
    D2  Always          000000+
    (4ADIX    rem id)  Remediation issue. Invalid dates/intervals; exceptions to be handled or other variable type (vs. filter)?
    (3Z       cat id)  Processes apparent YY dates with few, if any, aspects predictive of y2k failure.
  Y2 filter passed 90.0% (      18):             'Y2 - I2|Y2  SUB   Years      '    (FIL# 4)
      --- Input Ranges --- Decade         00  10  20  30  40  50  60  70  80  90.                Y2k%  XYI%  EOC%
    D1  000060+ to      000099+YY %                                   6     28   67. Date pattern              100
    D2  Always          000000+
    >>                  Invalid Op   Op Piv Ex
    >>                       2
S/390: SUITE17 .SUITE17 .0117DE.         S     5B30AF70 .                   52 execution instances.
  Cobol: 003883        THEN   SUBTRACT LIN-4 FROM LIN-4-HOLD GIVING REM                          LIST01 line 023798
    (5GSDA    rem id)  Linear information. Special date among inputs, no other remediation id assigned.
  Li filter passed 100.0% (     52):             'Li - Li/days  SUB  Lin idx 1'   IDX = 01   (FIL# 65)
      --- Input Ranges --- Decile      1880 1895 1910 1925 1940 1955 1970 1985 2000 2015         Y2k%  XYI%  EOC%  OPR%
    D1  001827– to      021550+YY %                         2    23   29   33   12   2. Dates with exceptions  15   85
    D2  040176– to      017776+                                                      OPR% large day intervals       85
    >>                  Op1 Sp Dat   Opt Sp Dat
    >>                       1
```

REM-HI.LISTING (High Remediation-Failure Potential)

Table 3 above shows a REM-HI file that contains a summary for each instruction having high remediation-failure potential.

The first instruction passed a filter for comparing Gregorian dates containing two-digit years (G2); it was rejected (Invalid op=3) when inputs were not valid dates. Catalog (Y2K) and remediation ids are shown; the latter suggests Y2-case-model failures involving cross-pivot compares (Cross Piv=10). Special dates were among the inputs (Op1 Sp Dat=2 and Op2 Sp Dat=1).

The second display shows a CLC that passed a filter for Gregorian dates with four-digit years (G4). Remediation id 4DDIX indicates that some inputs were not valid dates, so exceptions must be handled by remediation. The histograms use 15-year deciles (e.g., 1970-1984). Two special dates appear as inputs.

The third instruction compared true, zone-decimal Julian dates containing two-digit years (J2). Remediation id 4ALTA indicates that a non-pivot date with pivot-like characteristics (68366) was always compared and suggests a pivot conflict.

The fourth id, 4CRSA, flags an instruction that adds to Gregorian dates with three-digit-year offsets (G3). Interval range 90000-450000 represents 9-45 years, the dates span 1989-2004, and the histograms use 13-year deciles (e.g., 078-090). One sum (Res Piv Ex=1) fell outside the 100-year pivot range, suggesting a failure of Y3-offset-model remediation.

The fifth instruction received remediation ids from two filters for adding linear dates to day intervals—the first filter seeks dates in the first input stream (Li+Days), while the second seeks intervals in that stream (Days+Li). The first filter found 87% of the day intervals above a three-year span (OPR %>1095), making it more likely that the second input stream contains dates. Remediation-id severity 5 was assigned because of the high OPR %. The other filter found dates in the second input stream and a 17-day span of intervals in first. The remediation id is 4GDAX because two inputs were invalid dates and two valid dates were outside the 100-year pivot range.

The sixth id, 4GDAX, flags an instruction that compares dates in the linear sequence for IDX 1 (LINEAR DAY 0 is Jan. 1, 1960). Four inputs lie outside the 100-year pivot range (Op Piv Ex=4).

The seventh id, 4GDAX, flags an instruction that divides linear dates (IDX 1) by seven, perhaps to obtain day names. Some inputs are not in the 100-year pivot range (Op Piv Ex=2), and 13% lie in the XYI.

The eighth instruction compares linear dates to a special date, perhaps to branch to a special-date handler. The program is examined to see if such handling is still appropriate for all special values.

The ninth id, 4GDIX, flags an instruction that subtracts linear dates or day intervals from linear dates; a 0-17 D2 range suggests that intervals are used. Two input dates are invalid and 12% are in the XYI.

The tenth instruction subtracts from dates in the linear sequence for IDX 2 (LINEAR DAY 0 is Oct. 15, 1582). The D2 range suggests that days are subtracted. Some results are in the XYI (Res in XYI=2 and remediation id 4GXCA).

The 11th id, 4CD3X, tags an instruction that divides three-digit-year offsets (Y3) by 4. The Y3 range is 17-185 (1917-2085), with Y3=100 in 64 cases (Year 2000). Six Y3s fell outside the 100-year pivot range (Op Piv Ex), and 27 inputs were not valid offsets (Invalid op); both suggest Y3-offset-model failures.

The 12th instruction divided four-digit years by 4. Y4 was 2000 in 64 cases, so the analysis suggests examining how 2000 is treated in a possible leap-year routine. Y4 fell outside the pivot range in 82 cases (Op Piv Ex), and an input was not a valid date in 30 others (Invalid op).

The last id, 4EDAX, flags an instruction that compared both true and complement dates. In five cases, inputs were outside the pivot range (Op Piv Exc), three instances found invalid dates, and special dates were encountered.

REM-OTH.LISTING (Lesser Remediation-Failure Potential)

Table 4 above shows part of a file that summarizes each instruction having lesser remediation-failure potential.

The first instruction, compare, received (Y2K-failure) catalog and remediation ids from a filter for Gregorian dates containing two-digit years (G2). Both ids indicate comparing to a pivot.

The second instruction, subtract (SP), received remediation ids from two filters. It passed a Y3 filter more frequently (100% vs. 90%), so Y3 dates are possible; if so, no remediation problem is suggested by id 5CHF.

The last instruction received remediation id 5GSDA from a linear-date filter. A special date was an input, but no other remediation aspects were found.

Post-Processor Logic

To summarize, FIG. 3 indicates that the post-processor 220 has two subprograms. Subprogram 1 analyzes traces to produce working files that are used by Subprogram 2. Embodiments of each of these programs are presented in greater detail below.

Subprogram 1 (Filter)

Program 1, as shown in FIG. 3, processes a trace file produced as described above. Each record in the trace file summarizes execution values for one instance of an instruction. That is, an instruction at a given offset in a given CSECT and load module is generally executed, and therefore traced, many times.

Each record in the trace file is tested against each filter in the filter file or table (see "FIL-FILE.DATA-IN" above), using parameters taken from the run-control file (see "FILTER.RUN-CTLS" above) to determine whether the instruction and operand values recorded in the trace pass the tests specified by the filter.

The steps taken for each trace-filter pair are matching the instruction op code in the trace with the instructions specified by the filter, comparing the operand lengths in the trace (for a CLC or decimal instruction) to the length ranges specified by the filter, determining whether the operand values are valid for the date format specified by the filter, and performing a special test appropriate to the instruction type. The instruction is said to pass the filter when there is an op-code match, the operand lengths and values are within the filter-specified ranges, the operand values are valid for the specified date-type, and any special test is passed; otherwise, the instruction is rejected by the filter.

The date-types and corresponding validity conditions are:
1. Two-digit year (YY): the operand-value V for the instruction instance is such that $0 \leq V \leq 99$.
2. Julian date with two-digit year (YYDDD, YY/DDD): the operand-value, when expressed as a decimal number VV...VDDD with three low-order digits DDD and two or more high-order digits VV...V, is such that $0 \leq VV...V \leq 99$ and either $1 \leq DDD \leq 365$ or else DDD=366 if VV...V represents a leap year.
3. Gregorian date with two-digit year (YYMMDD, YY/MM/DD): the operand value, when expressed as a decimal number VV...VMMDD with two low-order digits DD, two intermediate digits MM, and several high-order digits VV...V, is such that $1 \leq MM \leq 12$, DD indicates a valid day number within the month whose number is MM, and $0 \leq VV...V \leq 99$.
4. Four-digit year (YYYY): the operand-value V for the instruction instance is such that Y4 LOW LIMIT $\leq V \leq$ Y4 HIGH LIMIT.
5. Julian date with four-digit year (YYYYDDD): the operand value, when expressed as a decimal number VV...VDDD with three low-order digits DDD and three or more high-order digits VV...V is such that Y4 LOW LIMIT $\leq$ VV...V $\leq$ Y4 HIGH LIMIT and either $1 \leq DDD \leq 365$ or else D=366 if VV.V is a leap year.
6. Gregorian date with four-digit year (YYYYMMDD): the operand value, when expressed as a decimal number VV...VMMDD with two low-order digits DD, two intermediate digits MM, and four or more high-order digits VV...V is such that $1 \leq MM \leq 12$, DD indicates a valid day within the month whose number is MM, and Y4 LOW LIMIT $\leq$ VV...V $\leq$ Y4 HIGH LIMIT.
7. Three-digit year offset (YYY) from 1900: the operand-value V for the instruction instance is such that Y2K LIMIT $< V \leq$ Y4 HIGH LIMIT–1900.
8. Julian date with three-digit year offset (YYYDDD): the operand value, when expressed as a decimal number VV...VDDD with three low-order digits DDD and three or more high-order digits VV...V is such that Y2K LIMIT $\leq$ VV...V $\leq$ Y4 HIGH LIMIT–1900 and either $1 \leq DDD \leq 365$ or else D=366 if VV.V is a leap year.
9. Gregorian date with three-digit year offset (YYYMMDD): the operand value, when expressed as a decimal number VV...VMMDD with two low-order digits DD, two intermediate digits MM, and four or more high-order digits VV...V is such that $1 \leq MM \leq 12$, DD indicates a valid day within the month whose number is MM, and Y2K LIMIT $\leq$ VV...V $\leq$ Y4 HIGH LIMIT–1900.
10. Linear date: the operand value is between the linear date corresponding to January 1, Y4 LOW LIMIT and December 31, Y4 HIGH LIMIT. The correspondence is obtained by using the LINEAR DAY 0 value specified by the user (e.g., Jan. 1, 1960).

The validity determination is made by testing the operand value, whatever its length or format. For example, zoned-decimal value 75 is identified as valid for the two-digit-year format when the value is contained in an operand that is 2-18 bytes long. And binary value 75 is identified as valid when it is contained in a halfword, word, or double word operand.

A record is written to the pass-detail file when the instruction passes the filter. The record identifies the instruction using its load-module and CSECT names, its offset within the CSECT, and its trace-file index; information derived from the filter and the trace record is also added. The load-module and CSECT names and the CSECT offset are derived from the trace record for the instruction; the trace-file index is the number of the record in the trace file. The other information includes:
1. The instruction text and operand values taken from the trace;
2. Indicators of which operands are dates, the year (YY, YYY, or YYYY) values derived from the dates, an indication of whether the date contains two-digit years, three-digit-year offsets, or four-digit years, and an indication of whether the dates are in true or nines—complement form;

3. An indicator of whether the instruction and its operands match a remediation-failure paradigm;
4. For instructions that pass CLC-decimal filters, an indication of whether the operands are in packed-decimal (PD), zoned decimal (ZD), Julian-date-with separator (JS), or Gregorian-date-with-separator (GS) form;
5. For instructions that pass compare or CLC filters, an indication of whether the instruction was followed by a branch-on-equal or a branch-on-not-equal;
6. For instructions that pass subtract or add filters, an indication of whether the instruction produced a negative result; and
7. The RULE-ID, filter type, date type, and COMMENT from the filter, and the index of the filter within the filter file.

Figure 4:
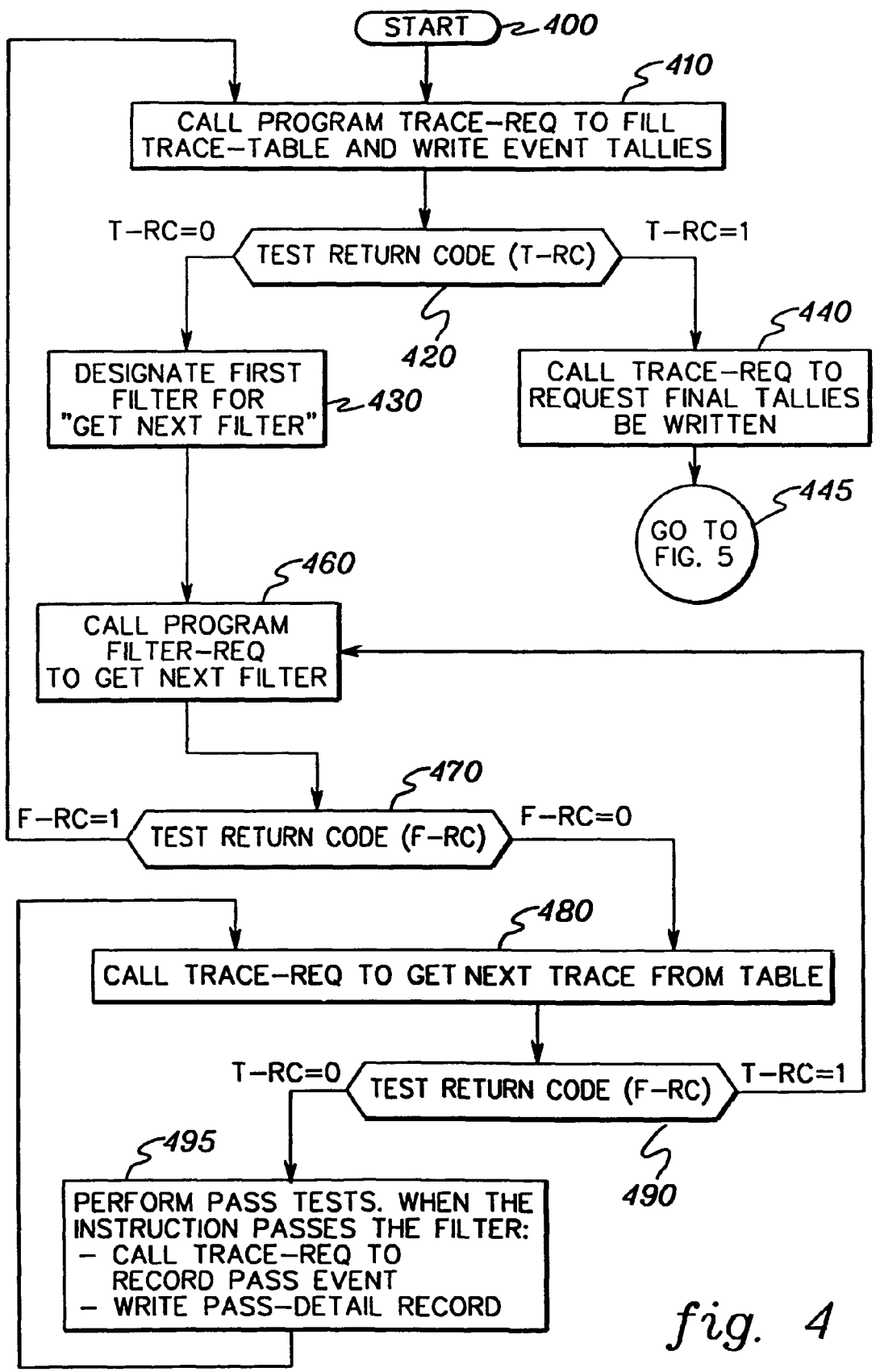
FIG. 4 is a flowchart of one embodiment of the filter program of FIG. 3.

FIG. 4 shows how all of the traces and filters are processed in accordance with one embodiment of the present invention.

Processing starts 400 by calling a program (TRACE-REQ) to manage the trace file and a TRACE-TABLE in main storage 410. The table contains slots that allow some number of traces (e.g., 256) to be copied to main storage for rapid access by the filter program. The called program has three major functions:

1. Fill the TRACE-TABLE: the next group of records is read from the trace file. Information derived from the trace records is placed in the TRACE-TABLE. A return code, T-RC, indicates whether records from the file have been placed in the table 420. T-RC is 0 when they have; T-RC is 1 when no records remain to be read from the file. When T-RC is 0, a pointer is set to cause the first record in the table to be returned when the next record is requested by the filter program 430.

This information is derived from the trace records:
  a. The instruction location (load module name, CSECT name, and CSECT offset), the instruction text, and the trace-file index for the trace record.
  b. The operand values for the instruction, three indications of whether the operands are valid dates in each of the standard date formats (see "Date format" in Table 2), and year values extracted from the operands for date formats that are valid. A value may be a valid date in more than one format. For example, the operand value 12 is a valid two-digit year (YY) as well as a valid Julian date (00012).
  c. If the instruction is a CLC, indications of whether its operands are in packed-decimal, zoned-decimal, Julian-with-separator, or Gregorian-with—separator form.
  d. If the instruction is a compare or a CLC, indication of whether or not it is followed by a branch-on-equal or a branch-on-not-equal test.

2 Supply the next trace in the TRACE-TABLE: the record is copied to a work area that is accessible to the filter program. T-RC is 0 when a record is supplied; T-RC is 1 when all of the traces were returned previously.

3 Record a pass event for the last trace that was returned. The called program tallies the number of filters that pass each trace in the TRACE-TABLE. When all of the traces in the table have been processed against all of the filters, as indicated by a request that the table be refilled by a new group of traces, the tallies are written to the pass-miss file 440. One record is placed in the pass-miss file for each trace in the table; the record identifies the instruction by its load-module and CSECT names, its CSECT offset, and its trace-file index. It also records the number of filters that passed the instruction; the number is zero when the instruction is rejected by all of the filters.

Another called program (FIL-REQ) supplies records from the filter file or table 312 to the caller 460. The called program sets a return code, F-RC, to indicate whether a record has been resumed 470. F-RC is 0 when it has; and F-RC is 1 when no filters remain to be copied from the filter file or table 312.

The filter program starts off by entering the primary loop at its first step 400.

The primary loop in FIG. 4 starts with a call to TRACE-REQ to fill the TRACE-TABLE 410. When T-RC is 0 (420), indicating that traces have been copied to the TRACE-TABLE, Program 1 calls FILTER-REQ 430 to indicate that its next request for filter is to be satisfied starting from the beginning of the filter file. Otherwise, T-RC is 1 so the program is completed by calling TRACE-REQ to indicate that all of the final traces in the TRACE-TABLE have been processed 440 (whereupon processing proceeds to FIG. 5).

When T-RC is 0 (above), the filter program enters a secondary loop. The first step of the loop is to call FIL-REQ to return the next filter 460. When return code F-RC is 0, indicating that a filter was returned, Program 1 enters a tertiary loop that tests all of the traces in the TRACE-TABLE against the filter 480, 490. Otherwise, F-RC is 1, indicating that no filters remain, and the program returns to the top of the primary loop to fill the TRACE-TABLE with the next group of traces.

As noted, when F-RC is 0, Program 1 enters the tertiary loop, the first step of which is to call TRACE-REQ to fetch the next trace from the TRACE-TABLE 480. When T-RC is 1, indicating that all of the records in the TRACE-TABLE were returned previously, Program 1 returns from testing the return code 490 to the first step in the secondary loop to get the next filter 460; otherwise, T-RC is 0, indicating that a trace record was returned, so Program 1 performs pass tests for the current filter and current trace 495. When the instruction passes the filter, TRACE-REQ is called to record the pass event and a record is written to the pass-detail file, as described above. Then, Program 1 returns to the first step of the tertiary loop.

Subprogram 2 (Aggregation)

Subprogram 2 (herein "Program 2") as shown in FIG. 3, processes the pass-miss and pass-detail files from Program 1 in order to summarize the results, for each instruction, of all of its execution instances. The summaries are placed in the output files described above.

Figure 5:
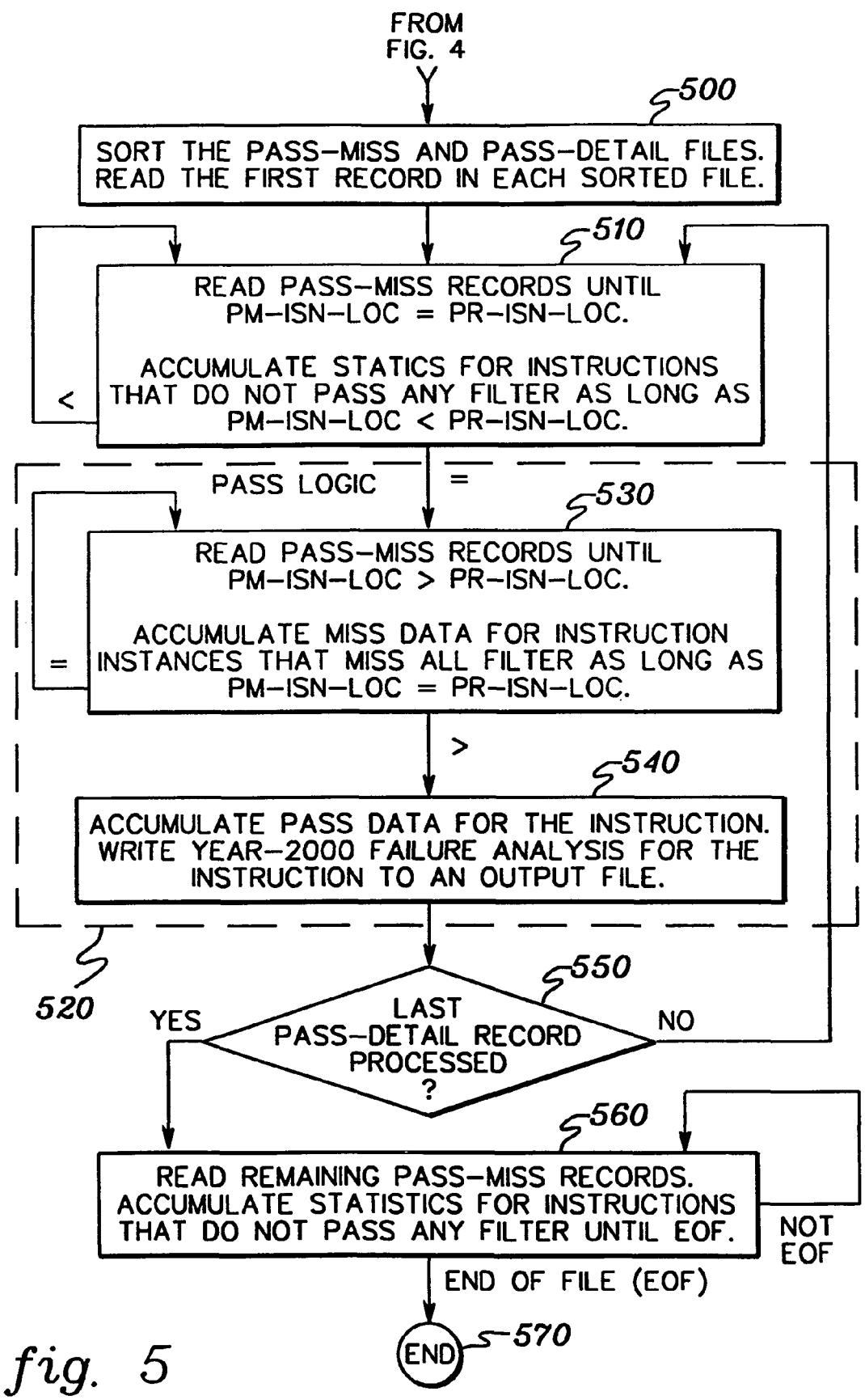
FIG. 5 is a flowchart of one embodiment of the aggregation program of FIG. 3.

Details on Program 2 are shown in FIG. 5. Program 2 starts by sorting the pass-miss and pass-detail files to prepare for a "sort-merge-join" operation 500. The pass-miss records are sorted by ascending instruction location; the pass-detail records are sorted by ascending instruction location and trace-file index. The instruction location is the concatenation of a load-module name, CSECT name, and offset within the CSECT. Thus, all execution instances of the same instruction are grouped into consecutive records of the sorted files.

The first records of the sorted pass-miss and pass-detail files are read into main storage in preparation for entering the primary loop of FIG. 4. The pass-detail record is called the current pass-detail record, and the instruction represented by that record is called the current instruction in the following description.

The first step in the primary loop is to read pass-miss records until the instruction location in a pass-miss record (PM-ISN-LOC) is equal to the instruction location in the current pass-detail record (PR-ISN-LOC) 510. When the two are not equal, the instruction instance represented in the pass-miss record has not passed any filter. Counters for the number of such unique instructions (NUM-ISN-NFIL) and the number of misses for all of the instances of such instructions (NUM-MIS-NFIL) are accumulated. A new instruction is recognized when the instruction location in the pass-miss records changes.

The next step is to read further pass-miss records until the instruction location in a pass-miss record is greater than the instruction location in the current pass-detail record 530. When the pass count in a pass-miss record having the same instruction location as the current pass-detail record is zero, indicating an instance of the current instruction that did not pass any filter, a counter for the number of misses for the current instruction (NUM-MISS) is incremented.

Next, all of the pass-detail records for the same instruction location as the current instruction are processed, as is explained below with reference to FIGS. 6a and 6b, to accumulate pass data for all execution instances of the instruction and to write certain file records 540.

Execution in the primary loop ends if the last pass-detail record has been processed 550; otherwise, execution returns to the first step of the primary loop 510.

When the primary loop in FIG. 3 has been completed, any remaining records in the pass-miss file represent other instructions that did not pass any filter. The records are read, until an end-of-file (EOF) condition is encountered, and counters for the number of such instructions (NUM-ISN-NFIL) and the number of misses for all of the instances of such instructions (NUM-MISS-NFIL) are incremented, based on the record contents 560. Once again, a new instruction is recognized when the instruction location in the pass-miss records changes.

Program 2 ends 570 when the last record in the pass-miss file has been processed.

Figure 6A:
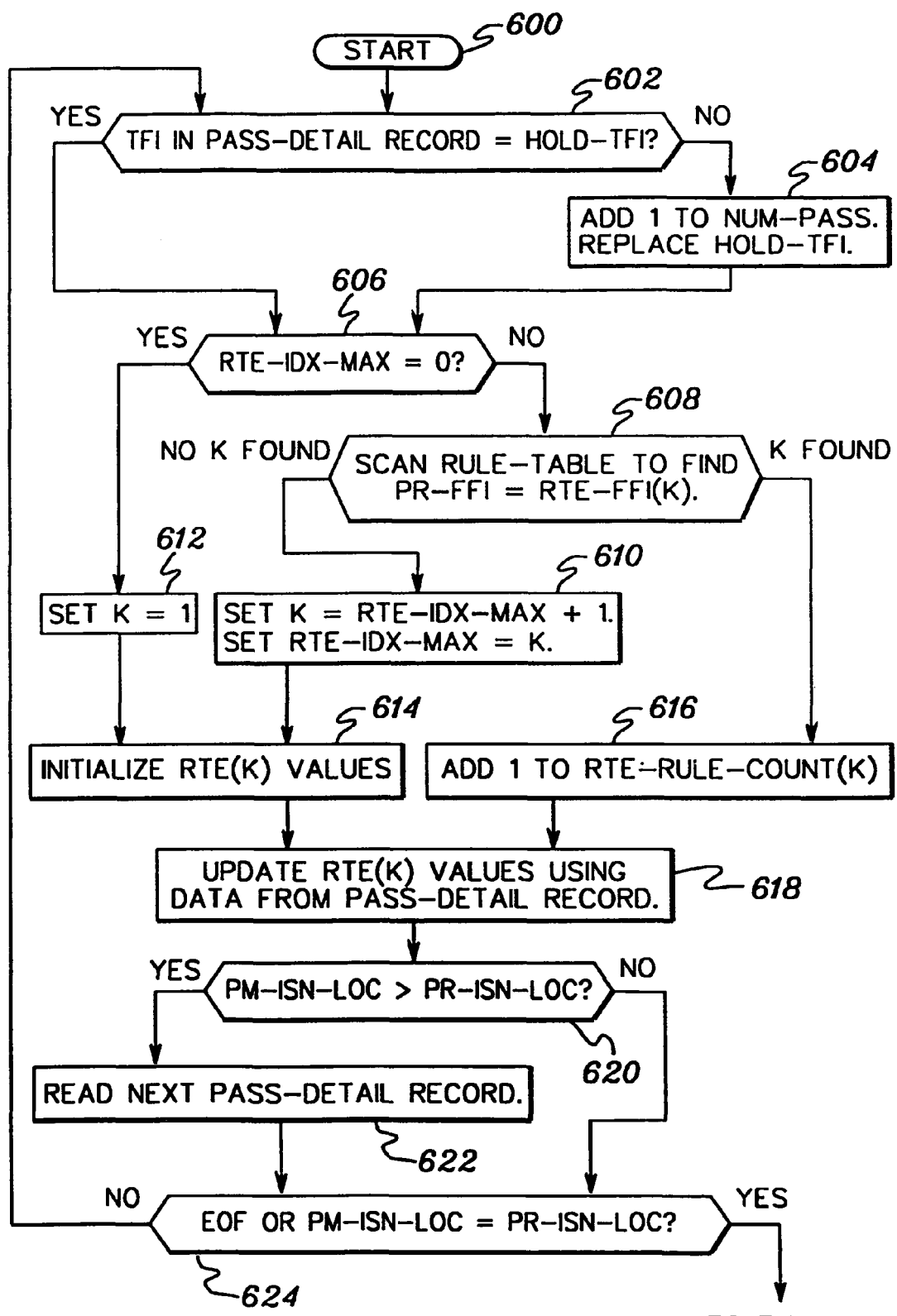
FIGS. 6a and 6b are a flowchart of one embodiment of the pass logic employed in the aggregation program of FIG. 5.
Figure 6B:
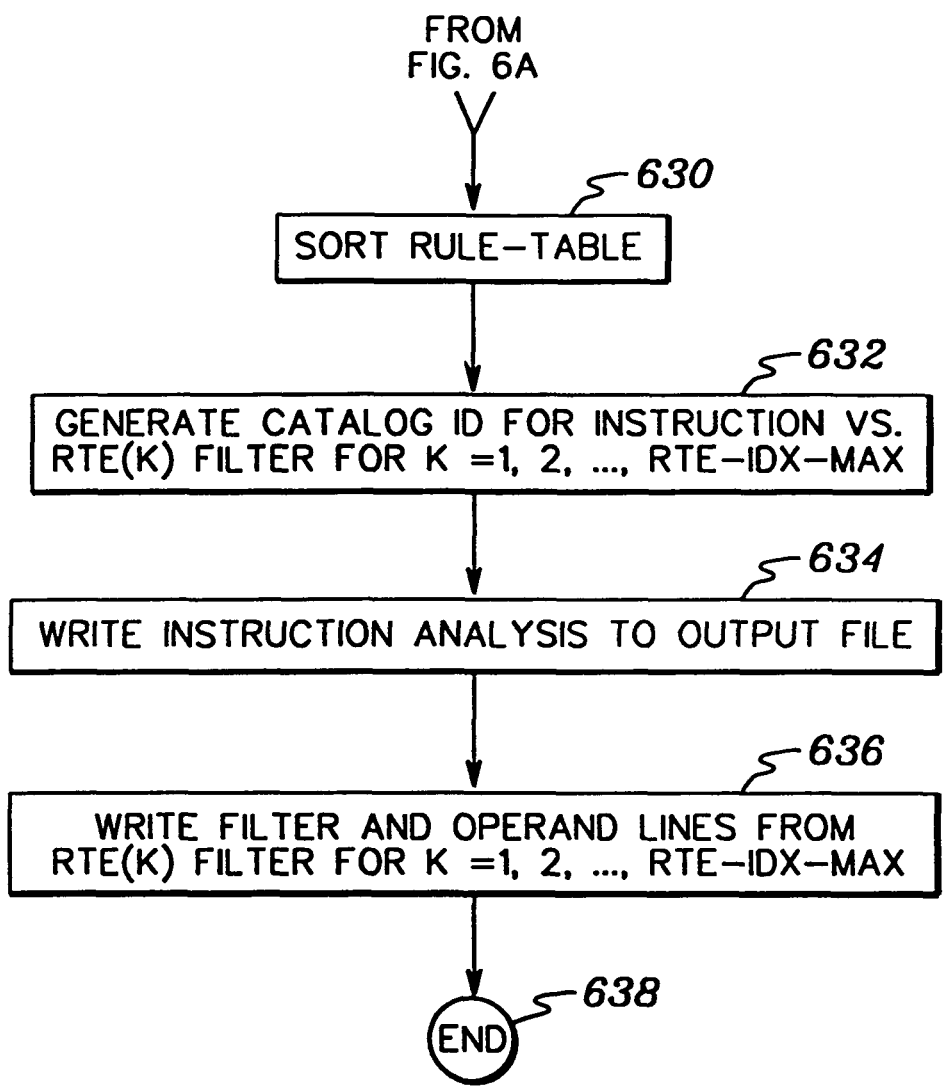

FIGS. 6a and 6b show more details on a specific aspect of Program 2; that is, the program 6 fragment 520 of FIG. 5 that accumulates information about all execution instances of an individual instruction in a RULE-TABLE. Entries in the RULE-TABLE are made to correspond to filters that passed the instruction. Each entry contains counters and other fields where maximum and minimum values are derived.

First, the variable HOLD-TFI is initialized to all zeros. HOLD-TFI is used to determine when the pass-detail records for a new instruction instance start.

The first loop of FIG. 6a starts 600 by comparing the trace-file index (TFI) in the current pass-detail record to HOLD-TFI 602. When they are not equal, a new execution instance of the current instruction has been encountered, so one is added to a counter (NUM-PASS) for the number of instances of the current instruction that have passed some filter, and the TFI from the pass-detail record replaces the previous HOLD-TFI value 604.

Next, values from the pass-detail record are used to update the RULE-TABLE entry assigned for the filter whose filter-file index (FFI) is designated in the record. There are three cases to consider:
1. The RULE-TABLE is empty (RTE-IDX-MAX, which designates the highest numbered entry that is in use, is zero 606): The first entry in the table is selected ("Set K=1") 612, and the values in entry RTE(K) are initialized by copying the FFI value in the pass-detail record to a field within the entry, setting the counter RTE-RULE-COUNT{K) to one, resetting other counters in the entry to zero, and copying the operand values from the pass-detail record to operand-maximum and operand-minimum variables in the entry 614.
2. The RULE-TABLE is not empty (RTE-IDX-MAX is not zero), but none of the entries in the table has been assigned to accumulate information for filter FFI 608. The next unused entry is selected ("Set K=RTE-IDX-MAX+1" and "Set RTE-IDX-MAX=K") 610, and the values in entry RTE(K) are initialized 614 as is described above.
3. Entry K in the table has already been assigned to accumulate information for filter FFI 608. One is added to counter RTE-RULE-COUNT(K), which tallies the number of instances of the current instruction that were passed by the filter 616.

In any case, values from the pass-detail record are used to update counters and operand-range values in entry RTE(K) 618, as follows:
1. For instructions that pass subtract or add filters, add one to counter RTE-NR-NUM(K) if the instruction produced a negative result.
2. For instructions that pass CLC-decimal filters, use the indication of whether the operands are in packed-decimal (PO), zoned-decimal (ZD), Julian-date-with-separator (JS), or Gregorian-date-with-separator (GS) form to add one to counter RTE-PD-NUM(K), RTE-ZD-NUM(K), RTE-JS-NIJM(K), or RTE-GS-NUM(K), as appropriate.
3. Use the indication of whether the dates processed by the instruction are in true or nines-complement form to add one to counter RTE-T-DATE(K) or RTE-C-DATE(K), respectively.
4. Determine the deciles of the operand YY, YYY, or YYYY values, as appropriate, and add one to the appropriate decile counters. The counters are used in forming histograms.
5. Use the operand YY, YYY, or YYYY value (as appropriate) to add one to "Y2K range counters" for operands 1 and 2 when the year values are in the Y2K range, to add one to "EOC range counters" for operands 1 and 2 when the year values are in the EOC range, to add one to XYI range counters for operands 1 and 2 when the year values are in the XYI range, to add one to "OPR counters for operands 1 and 2 when the year values for Y3 and Y4 dates are outside the 100-year range defined by the pivot.
6. Update the maximum and minimum values for operands 1 and 2, as appropriate. For example, if the operand 1 value in the pass-detail record is larger than the present maximum for operand 1, use the larger value to replace the present maximum.
7. For instructions that pass divide filters for three-digit-year offsets (Y3), add one to counter RTE-Y2K-FAIL-NUM(K) when the YYY value is 100 (representing the year 2000).
8. For compare, add, subtract, or divide instructions that pass filters for three-digit-year offsets and whose input YYY values fall outside the 100-year range defined by the pivot, add one to counter RTE-OP-RANGE-ERR(K).
9. For multiply instructions that pass filters for three-digit-year offsets and whose YYY inputs are negative, add 1 to counter RTE-Y2K-FAIL-NUM(K).
10. For add or subtract instructions that pass filters for three-digit-year offsets and whose result (sum or difference) falls outside the 100-year range defined by the pivot, add one to counter RTE-RES-PIV-ERR(K).
11. For instructions that pass divide filters for four-digit-years (Y4), add one to counter RTE-Y2K-FAIL-NUM(K) when the YYYY value is 2000.
12. For compare, add, subtract, or divide instructions that pass filters for four-digit years and whose input YYYY values fall outside the 100-year range defined by the pivot, add one to counter RTE-OP-RANGE-ERR(K).
13. For add or subtract instructions that pass filters for four-digit-years and whose result (sum or difference) falls outside the valid range for four-digit years by above the maximum interval for Y4 values (i.e., Y4 HIGH LIMIT–Y4 LOW LIMIT), add one to counter RTE-RES-INV(K) because the result is neither a valid year nor a valid interval.

14. For add or subtract instructions that pass filters for four-digit-years and whose result (sum or difference) falls outside the 100-year range defined by the pivot, add one to counter RTE-RES-PIV-ERR(K).
15. For add or subtract instructions that pass filters for linear dates and whose non-date input is outside the range −1,096 to +1,096, add one to counter RTE-RES-BPR-ERR(K) because the value is not a day interval in a three-year range. But if the non-date input is in the indicated range, add one to counter RTE-LDR-NUM(K).
16. For instructions that pass filters for linear dates and whose date inputs correspond to the SPECIAL GREGORIAN or the SPECIAL JULIAN date, add one to the appropriate counter RTE-OP-SPEC-NUM(K1) for operand 1 or 2.
17. For instructions that pass filters for linear dates and whose corresponding input YYYY values fall outside the 100-year range defined by the pivot, add one to counter RTE-OP-RANGE-ERR(K).
18. For add or subtract instructions that pass filters for linear dates, and whose non-date inputs are valid day intervals in the range −1,096 to +1,096, (A) if the result (sum or difference) falls into the XYI, add one to the counter RTE-RES-XYI-NUM(K); (B) else if the result is outside the range of valid linear dates, add one to the counter RTE-RES-INV(K); (C) else if the result is outside the 100-year range defined by the pivot, add one to the counter RTE-RES-PIV-ERR(K).

After entry RTE(K) is updated, a test is made to determine whether the instruction location in the pass-miss record is greater than the instruction location in the pass-detail record 620; if so, the next pass-detail record is read and becomes the current pass-detail record 622.

The last step in the loop is to return to the start of the loop when the last record in the pass-detail file has not been read and the instruction location in the pass-miss record is not equal to the instruction location in the current pass-detail record 624. Otherwise, execution continues as shown in FIG. 6b.

As shown in FIG. 6b, the first step is to sort the RULE-TABLE elements by descending RTE-RULE-COUNT 630. The element for the filter that recorded the greatest number of passes for the current instruction appears first, the element for the next highest number of passes is next, and so on.

The second step is to process each element of the sorted RULE-TABLE in turn. The information in each rule-table element (RTE) is used to generate a remediation id for the instruction-filter pair according to Table 1 632.

Next, processing writes a record identifying the instruction to file REM-HI.LISTING or REM-OTH.LISTING 634. The file is determined using the remediation id recorded in variable RTE-RCAT(K); that is, the id assigned for the filter that passed the instruction most frequently. The record contains the instruction location and text; and also indicates how many instruction instances were passed by some filter and how many were rejected by all of the filters. By way of example, see Tables 3 and 4.

The last step of FIG. 6b also processes each element of the sorted RULE-TABLE. In particular, information in each element is used to generate a related set of records for the same instruction-analysis file as above 636. In one embodiment, the information included in each related set of records is as follows:
1. The remediation id assigned to the instruction for the filter whose FFI value is RTE-FFI(K); the RULE-ID and COMMENT from the filter, its FFI value, and an indication of what percentage of the instruction instances passed the filter.
2. For compare and CLC instructions, an indication of how many execution instances processed true dates and nines complement dates; for CLC instructions, an indication of how many instruction instances processed packed-decimal (PD), zoned-decimal (ZD), Julian-with-separator (JS), and Gregorian-with-separator (GS) dates.

The range of values taken by operand 1 of the instruction across all of the instances that passed the filter; a histogram showing the decade or decile populations, in percent of the total, for the year (W) values extracted from operand 1 for all of the passing instances; and the percent of the YY parts of the operand 1 values that fell into the Y2K, XYI, EOC, and OPR ranges. Similarly for operand 2.

3. For add or subtract instructions that pass filters for dates containing four-digit years (Y4), for dates containing three-digit-year offsets (Y3), or for linear dates, indications of the following:
   a. how many instances encountered invalid dates in a date input stream
   b. how many instances encountered date inputs that were outside the 100-year range defined by the pivot
   c. how many instances encountered invalid dates in a date input stream
   d. how many instances encountered date inputs that were outside the 100-year range defined by the pivot
   e. how many instances yielded results outside the 100-year range defined by the pivot
   f. how many yielded results outside the valid range for the date type
   g. how many yielded results in the XYI
4. For divide instructions that pass filters for dates containing four-digit years (Y4) or dates containing three-digit-year offsets (Y3), indications of the following:
   a. how many instances encountered invalid dates in a date input stream
   b. how many instances encountered date inputs that were outside the 100-year range defined by the pivot
   c. how many instances encountered a date representing the year 2000 (i.e., 2000 for Y4 values or 100 for Y3 values)
5. For divide instructions that pass filters for linear dates, indications of the following:
   a. how many instances encountered invalid dates in a date input stream
   b. how many instances encountered date inputs that were outside the 100-year range defined by the pivot
   c. how many instances encountered special dates in their first input stream
6. For compare or CLC instructions that pass filters for dates containing two-digit years (Y2), indications of the following:
   a. how many instances performed cross-pivot compares
   b. how many instances encountered invalid dates in a date input stream
   c. how many instances encountered date inputs that were outside the 100-year range defined by the pivot
   d. how many instances encountered invalid dates in a date input stream
   e. how many instances encountered date inputs that were outside the 100-year range defined by the pivot Thereafter, processing of the pass logic is complete 638.

Those skilled in the art will note that the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as part of a computer system or sold separately.

The flow diagrams depicted herein are exemplary. There may be other variations to these diagrams or the steps (or operations described herein) without departing from the spirit of the invention. For instance, the steps may be performed in differing order, or steps may be added, deleted, or modified. All these variations are considered a part of the claimed invention.

Although preferred embodiments have been depicted and described in detail herein, it will be apparent to those skilled in the art that various modifications, additions, substitutions and the like can be made without departing from the spirit of the invention and these are therefore considered to be within the scope of the invention as defined in the following claims.

What is claimed is:

1. A method for identifying remediation failures in a computer program comprising a sequence of instructions that has been remediated for year-2000 (Y2K) instruction failures in accordance with a predetermined remediation model, comprising the steps of:
   generating a trace file of the program containing a trace record of each execution instance of selected instructions susceptible to remediation failure; and
   comparing said trace records with failure patterns characteristic of known types of remediation failures to generate an output listing of potential remediation failures.

2. The method of claim 1 in which the remediation model is a Y2-case model in which two-digit years (Y2) remain in databases and the program uses case logic for dates above and below a pivot.

3. The method of claim 2 in which the failure pattern is one in which an instruction compares dates containing two-digit years, some dates straddle the pivot, and the instruction is not followed by a branch-equal or branch-not-equal.

4. The method of claim 2 in which the failure pattern is one in which a compare, add, subtract, or divide instruction that processes dates containing two-digit years encounters invalid dates; and for compare, it is not followed by a branch-equal or branch-not-equal.

5. The method of claim 1 in which the remediation model is a Y3-offset model in which three-digit-year (Y3) offsets from 1900 are created by adding 100 to Y2 values that are below a pivot.

6. The method of claim 5 in which the failure pattern is one in which a compare, add, subtract, or divide instruction that processes dates containing Y3 offsets encounters inputs that are outside the 100-year range defined by the pivot; and for compare, it is not followed by a branch-equal or branch-not-equal.

7. The method of claim 5 in which the failure pattern is one in which an instruction adds to or subtracts from dates containing Y3 offsets, and some results are above a 100-year range defined by the pivot.

8. The method of claim 5 in which the failure pattern is one in which a compare, add, subtract, or divide instruction that processes dates containing Y3 offsets encounters invalid dates; and for compare, it is not followed by a branch-equal or branch-not-equal.

9. The method of claim 5 in which the failure pattern is one in which an instruction compares Y3 values to 100 (meaning 2000) to make a leap-year determination, but the routine does not treat 100 as a leap year.

10. The method of claim 5 in which the failure pattern is one in which an instruction divides a three-digit year (YYY) by 4 to make a leap-year determination, and YYY sometimes is 100.

11. The method of claim 1 in which the remediation model is a Y4-Y2 model in which Y2 values are windowed to four-digit years (Y4) using a pivot to insert century values (19, 20).

12. The method of claim 11 in which the failure pattern is one in which a compare, add, subtract, or divide instruction that processes dates containing Y4 values encounters inputs that are outside the 100-year range defined by the pivot; and for compare, it is not followed by a branch-equal or branch-not-equal.

13. The method of claim 11 in which the failure pattern is one in which an instruction adds to or subtracts from Y4 dates, and some results fall above 199 but outside the 100-year range defined by the pivot.

14. The method of claim 11 in which the failure pattern is one in which a compare, add, subtract, or divide instruction that processes Y4 dates encounters invalid dates; and for compare, it is not followed by a branch-equal or branch-not-equal.

15. The method of claim 11 in which the failure pattern is one in which an instruction compares Y4 values to 2000 to make leap-year determinations, but the routine does not treat 2000 as a leap year.

16. The method of claim 11 in which the failure pattern is one in which an instruction divides four-digit years by 4, 100, or 400 to make leap-year determinations, and Y4 is sometimes 2000.

17. The method of claim 1 in which the remediation model is a full-Y4 model in which databases are expanded to hold Y4 dates but the dates range within a user-defined interval (e.g., 1900-2099) for testing purposes.

18. The method of claim 17 in which the failure pattern is one in which a compare, add, subtract, or divide instruction that processes dates containing four-digit years (Y4) encounters inputs that are outside a user-defined validity range; and for compare, it is not followed by a branch-equal or branch-not-equal.

19. The method of claim 17 in which the failure pattern is one in which an instruction adds to or subtracts from Y4 dates, and some results fall above 199 but outside a user-defined validity range.

20. The method of claim 1 in which the remediation model is a linear model in which Gregorian or Julian dates in databases are replaced by sequential numbers.

21. The method of claim 20 in which the failure pattern is one in which a compare, subtract, or add instruction that processes linear dates encounters inputs that are outside a user-defined validity range and for compare, it is not followed by a branch-equal or branch-not-equal.

22. The method of claim 20 in which the failure pattern is one in which an instruction that divides linear dates by 7 or 36525 encounters invalid inputs.

23. The method of claim 20 in which the failure pattern is one in which a compare, subtract, or add instruction that processes linear dates encounters dates that are not in the 100-year range defined by the pivot and for compare, it is not followed by a branch-equal or branch-not-equal; or an instruction that divides linear dates by 7 or 36525 encounters dates that are not in the 100-year range.

24. The method of claim 20 in which the failure pattern is one in which an instruction adds to or subtracts from linear dates and some results fall below the EOC range but above 1,096.

25. The method of claim 20 in which the failure pattern is one in which an instruction adds to or subtracts from linear dates, and some results are above 1,096 but outside a 100-year range defined by the pivot.

26. Apparatus for identifying remediation failures in a computer program comprising a sequence of instructions that has been remediated for year-2000 (Y2K) instruction failures in accordance with a predetermined remediation model, comprising:
- means for generating a trace file of the program containing a trace record of each execution instance of selected instructions susceptible to remediation failure; and
- means for comparing said trace records with failure patterns characteristic of known types of remediation failures to generate an output listing of potential remediation failures.

27. A program storage device readable by a machine, tangibly embodying a program of instructions executable by the machine to perform method steps for identifying remediation failures in a computer program comprising a sequence of instructions that has been remediated for year-2000 (Y2K) instruction failures in accordance with a predetermined remediation model, said method steps comprising:
- generating a trace file of the program containing a trace record of each execution instance of selected instructions susceptible to remediation failure; and
- comparing said trace records with failure patterns characteristic of known types of remediation failures to generate an output listing of potential remediation failures.

\* \* \* \* \*